United States Patent [19]

Gorbatenko

[11] Patent Number: 5,008,819
[45] Date of Patent: Apr. 16, 1991

[54] MEMORY SPACED ARRAY

[76] Inventor: George G. Gorbatenko, 924 Sierra La. NE., Rochester, Minn. 55904

[21] Appl. No.: 383,235

[22] Filed: Jul. 19, 1989

Related U.S. Application Data

[63] Continuation of Ser. No. 105,872, Oct. 7, 1987, abandoned.

[51] Int. Cl.$^5$ .................. G06F 7/00; G06F 13/00
[52] U.S. Cl. .................. 364/200; 364/248.1; 364/248.2; 364/248.5; 364/256.8
[58] Field of Search .................. 364/200, 900

[56] References Cited

U.S. PATENT DOCUMENTS

| | | | |
|---|---|---|---|
| 3,569,939 | 3/1971 | Doblamaier | 364/200 |
| 3,735,361 | 5/1973 | Tasso | 364/200 |
| 4,035,778 | 7/1977 | Ghanem | 364/200 |
| 4,128,891 | 12/1978 | Lin et al. | 364/900 |
| 4,221,003 | 9/1980 | Chang et al. | 364/900 |
| 4,283,771 | 8/1981 | Chang | 364/900 |
| 4,345,309 | 8/1982 | Arulpragasam | 364/200 |
| 4,384,329 | 5/1983 | Rosenbaum et al. | 364/300 |
| 4,412,285 | 10/1983 | Neches et al. | 364/200 |
| 4,422,145 | 12/1983 | Sacco et al. | 364/300 |
| 4,429,385 | 1/1984 | Cichelli et al. | 370/92 |
| 4,445,171 | 4/1984 | Neches | 364/200 |
| 4,468,204 | 8/1984 | Scott et al. | 434/309 |
| 4,476,528 | 10/1984 | Matsumoto et al. | 364/200 |
| 4,479,196 | 10/1984 | Ferrer et al. | 364/900 |
| 4,498,145 | 2/1985 | Baker et al. | 364/900 |
| 4,506,326 | 3/1985 | Shaw et al. | 364/300 |
| 4,514,826 | 4/1985 | Owata et al. | 364/900 |
| 4,543,630 | 9/1985 | Neches | 364/200 |
| 4,603,382 | 7/1986 | Cole et al. | 364/200 |
| 4,606,002 | 8/1986 | Waisman et al. | 364/200 |
| 4,627,019 | 12/1986 | Ng | 364/900 |
| 4,631,664 | 12/1986 | Bachman | 364/200 |
| 4,631,673 | 12/1986 | Haas et al. | 364/300 |
| 4,636,974 | 1/1987 | Griffin | 364/900 |
| 4,644,471 | 2/1987 | Kojima et al. | 364/300 |
| 4,655,129 | 4/1987 | Wirth et al. | 101/35 |
| 4,680,705 | 7/1987 | Shu | 364/300 |

OTHER PUBLICATIONS

"A Decomposition Storage Model," G. Copeland, S. Koshafiam, ACM Publication 1/85, pp. 268–279.

Primary Examiner—David Y. Eng
Attorney, Agent, or Firm—Kinney & Lange

[57] ABSTRACT

A computer system data base component having alterable state storage media therein in which information items are placed in a manner leading to optimal storage and retrieval operations.

78 Claims, 12 Drawing Sheets

| $A_1$ | $B_1$ | $C_1$ | $D_1$ |
|---|---|---|---|
| $A_2$ | $B_2$ | $C_2$ | $D_2$ |
| $A_3$ | $B_3$ | $C_3$ | $D_3$ |
| $A_4$ | $B_4$ | $C_4$ | $D_4$ |
| $A_5$ | $B_5$ | $C_5$ | $D_5$ |
| $A_6$ | $B_6$ | $C_6$ | $D_6$ |

*Fig. 2*

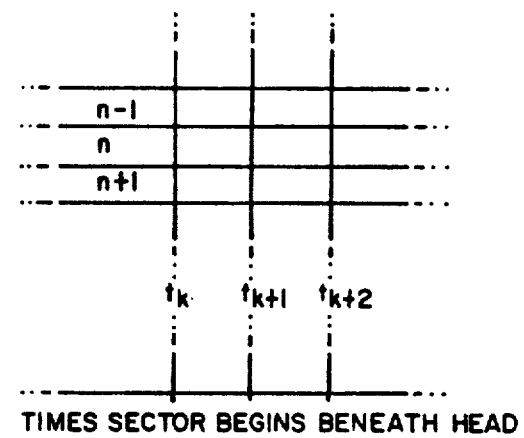

*Fig. 3*

TIMES SECTOR BEGINS BENEATH HEAD

| TIME | DISK X OPERATION | INFORMATION OUT | DISK Y OPERATION | INFORMATION OUT |
|---|---|---|---|---|
| $t_k$ | READ DATA OUT | $A_1$ | POSITION HEAD ON m-1 | -0- |
| $t_{k+1}$ | POSITION HEAD ON n | -0- | READ DATA OUT | $A_2$ |
| $t_{k+2}$ | READ DATA OUT | $A_3$ | POSITION HEAD ON m | -0- |
| $t_{k+3}$ | POSITION HEAD ON n+1 | -0- | READ DATA OUT | $A_4$ |
| $t_{k+4}$ | READ DATA OUT | $A_5$ | POSITION HEAD ON m+1 | -0- |
| $t_{k+5}$ | POSITION HEAD ON n+2 | -0- | READ DATA OUT | $A_6$ |

*Fig. 6*

TIMES SECTOR BEGINS BENEATH HEAD

TIMES SECTOR BEGINS BENEATH HEAD

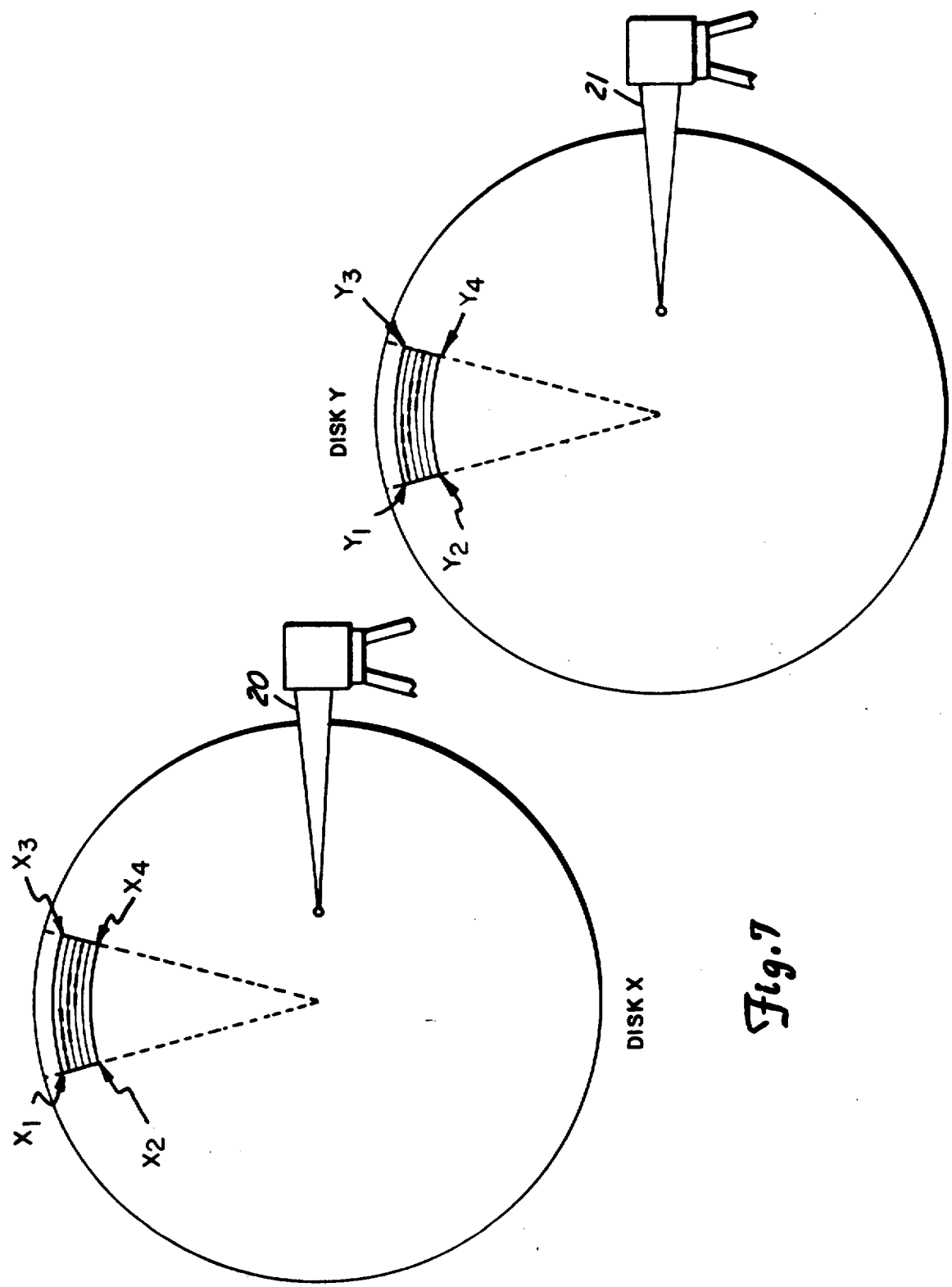

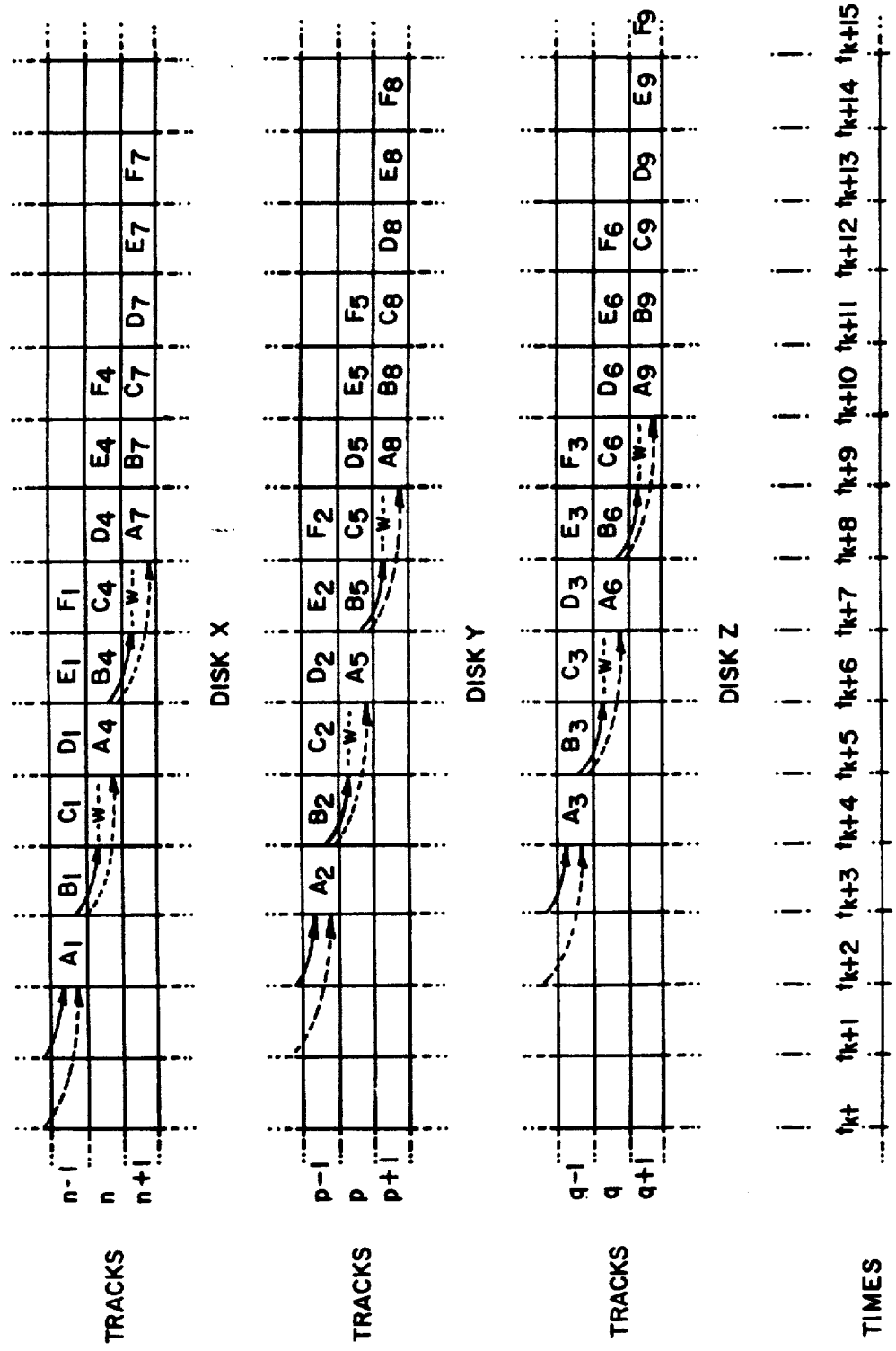

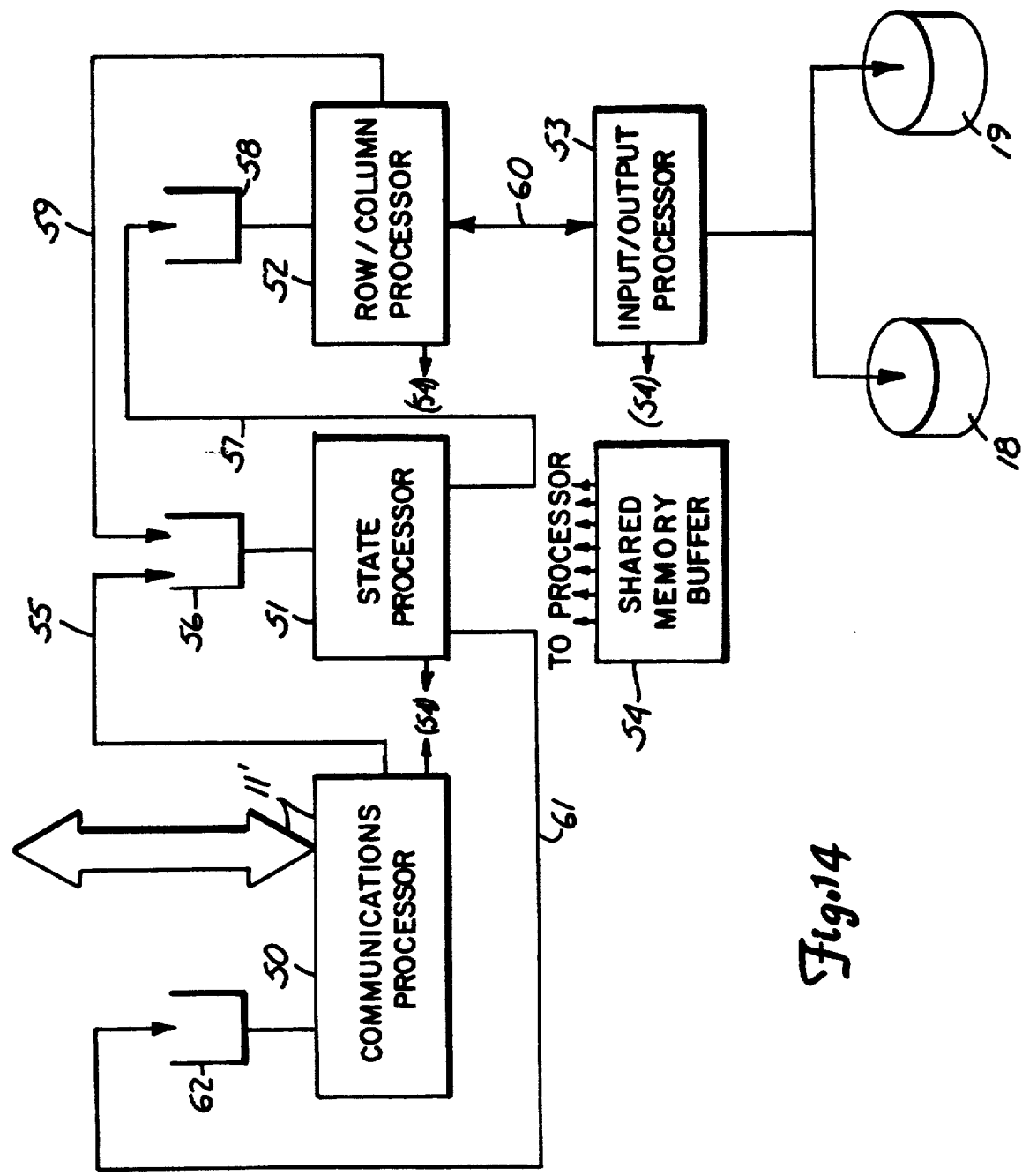

MEMORY SPACED ARRAY

This is a continuation of application Ser. No. 105,872, filed Oct. 7, 1987, now abandoned.

BACKGROUND OF THE INVENTION

The present invention relates to the storage and retrieval of information by electromagnetically responsive recording means and, more particularly, to such storage and retrieval where the information is of a kind having relationships between portions thereof which affect the arrangement of the storage means.

Storage and retrieval of information in system components relying on electromagnetic means is a central consideration in computer systems. The capabilities of such system components for these purposes have grown by orders of magnitude in recent years, both short term storage capabilities for information which is to be kept nearly immediately available to the central processing unit in the system, and longer term storage capabilities for information desired to be kept for longer terms. Information stored for longer terms is typically not available nearly as quickly to the central processing unit of the system as that kept in short term storage, but is often very voluminous necessitating a different approach than for short term storage approaches as the cost of storage becomes an overriding factor for such large information quantities. Nevertheless, the rate at which the central processing unit has access to such large volumes of information in longer term storage is always desired to be as great as possible even though compromises with cost are necessary.

A form of information which is often placed in longer term storage is "relational" data. Such data has portions thereof, i.e. information items, related in some manner to one another. Such data can very commonly be represented in tabular form, a presentation which also shows the relationship between the information items. In such a tabular arrangement, the rectangular array of information items comprising the tabulation may have a column assigned to each type of information item and a row assigned to each record which comprises an associated set of such information types. For example, a set of information types, one per column, could be a person's name in the first column, then address in the second, then telephone number in the third, and so on for several other types of personal data. Thus, each row would have the name of a particular person followed by that person's associated specific information items (address, telephone number, etc.) under each information type column for that person.

A database management system, as part of a computer system, will be used to store and retrieve such data from the system longer term memory. Such a longer term memory in a sufficiently large system will be provided in a database device, or machine, of some type, today commonly a database processor directing the information storage and retrieval operations of the machine typically formed at one or more magnetic disk drives. In earlier times, such a database machine might have been a punched card reader or a magnetic tape drive.

In a punched card storage arrangement, each of the foregoing rectangular array, or tabular, records in a row would be typically contained in separate paper cards in the form of coded punch-outs so that, in effect, the rows are stored end-to-end. Similarly, each such row would also be provided end-to-end along a magnetic tape in a sequence of coded magnetization of a magnetic material permitting small portions thereof to be placed in one of two magnetization states, such tapes being used in a magnetic tape storage arrangement including a tape drive. Thus, in these systems, the storage space appears to the database management system as a long, linear space.

For the most part, this same linear storage space concept has been provided in rotating magnetic disk storage arrangements currently used in database machines through having such rectangular array row records provided end-to-end along each concentric recording track present in the alterable state material on the face of the disk. Thus, with respect to a movable arm carrying a storage and retrieval sensing ("head") means over a disk recording track rotating therebelow, the information again appears to be stored in a long, linear space since the information is only available when the proper portion of the recording track has rotated past below this head. If the information is in another one of the recording tracks, the movable arm with the head must first be moved to that track with that track then permitted to rotate past therebelow until the desired portion of the track comes beneath the storing and sensing means. As a result of the sequential recording track motion past the head of the rows stored end-to-end as is the common practice, there will often be substantial delays in either storing or retrieving information in response to a request to do so by the central processing unit of the computer system.

Such magnetic disk storage arrangements have a magnetic disk formed by magnetic material deposited on a substrate, which material can have small portions therefor in one of two magnetization states along a series of concentric circular recording tracks. Each recording track is thus formed by a succession of magnetization regions, or storage sites, in each of which the magnetization state can be altered by an external magnetic field, and which are magnetized in accordance with the information item stored therein. Thus, during a storing operation, the succession of magnetization states in successive storage sites along a recording track are altered in accordance with each information symbol received by the database machine. These information symbols will be provided from other parts of the computer system in some coding scheme to differentiate successive information item representations from one another. These successive storage sites forming a recording track are then moved underneath the head to have magnetization states altered if new information is being stored ("written"), or to cause an electrical signal if the magnetization states present already represent an earlier storage of information which is now to be retrieved or "read out."

Alternative storage arrangements exist for database machines. In one of these, magnetic bubble storage memory, the alterable magnetization storage sites are magnetically moved to the stationary storing and retrieving means. A magnetic material substrate in which the magnetic domains ("bubbles") can be moved magnetically has various sector loops arranged to permit the bubbles therein to be continually moved past a transfer station to a track loop under the control of rotating magnetic fields. Each sector loop can be considered an analog of a recording track in a magnetic disk in which the presence or absence of bubbles represents information as does one or the other magnetization in a disk.

Information can be taken from or provided to a sector loop from the track loop at the transfer station, the track loop in turn moving a bubble domain with this information between the sector loops and a storing and retrieving means, formed by a sense amplifier and its transfer station.

Several approaches to reducing delays in storing and retrieving, i.e. reducing the time to reach the storage sites for such activities or "access" time in magnetic disk machines, have been previously resorted to. One of these is to have the start of the adjacent concentric recording track on the face of the rotating disk begin at some angular distance from the end of the preceding track. This gives the movable arm, with the head thereon, time to move from over the end of the first track to being over the adjacent track before information need be stored or retrieved from this adjacent track. Thus, the starts of next adjacent recording tracks are skewed angularly oppositely to the direction of rotation from the ends of preceding adjacent tracks.

Another approach has been to interleave sequentially ordered, defined length storage site sectors along recording tracks which are to have information items stored in or retrieved from by the head successively in sequential order to thereby give sufficient time for one such operation on each sequential storage site sector before beginning an operation on the next. Thus, a first storage site sector along a circular recording track on a rotating magnetic disk will have a first row record provided therein followed by a second storage site sector which is either blank or storing some other unrelated information or another row record not next in sequence. The following third storage site sector along the recording track will have the following second row record therein, etc.

Hence, a retrieval can be completed with respect to the first row record in the first storage site sector during the time the storage and recording head is over both the first and second storage site sectors so that the system will be ready to retrieve the second row record placed in the third storage site sector when that third sector comes underneath the head. This interleaving arrangement may be continued along the circular recording track and then along the next track. However, this interleaving arrangement presupposes that row records from a tabular arrangement will be read successively, a supposition which does not necessarily hold true in many data storing and retrieving situations where, for example, successive columnar retrievals may at times be desired.

Thus, another possibility which arises is that the columnar information items may be desired to be retrieved successively rather than the row records. This desire, of course, could be best accommodated by end-to-end storing of the columns of information items along the recording tracks rather than end-to-end storing of row information items. Nevertheless, this still views the disk recording tracks as essential a long, linear recording space leaving a slow retrieval situation on these occasions that retrieval by rows is necessary.

Beyond these approaches, there have been several approaches which rely on parallel operation to a greater or lesser extent to shorten the time of access to desired storage locations on the face of a magnetic disk for storing or retrieving information thereat. One possibility is to provide a movable arm with a storing and retrieving head thereon for each concentric recording track on the face of the magnetic disk. Unfortunately, somewhere around 70% of the cost of a single movable arm disk drive is associated with that arm and head and its associated electronic circuitry. Increasing the number of such arms and heads, and adding the associated circuitry, would be prohibitively costly for a magnetic disk permitting a track density such that 300 tracks could be provided thereon, a not uncommon track density. Similarly, there can be provided a plurality of sense amplifiers in the magnetic bubble memory structure just as there can be provided a plurality of movable arms with heads in a magnetic disk drive. Again, however, the additions of added sense amplifiers, and associated structures in the bubble memory structure, lead to the need for greater surface area in the chip which rapidly increases the cost, as does the addition of additional associated electronic circuitry. In the same manner, there could be provided multiple storing and retrieving means in the form of additional lasers and light sensors for each optical disk recording track, but again with substantial additional costs.

Another alternative for a database machine is use of an optical disk in which again there are circular concentric recording tracks along which the information is comprised by the presence or absence of pits in the surface material of the disk. Such presence or absence of pits leads to reflections or lack of reflected light provided by a laser which are sensed by a light detector.

As indicated, storing of information in such a disk is accomplished by providing such pits along the recording track in accord with the information being stored. Currently, this arrangement leads to recording information on such an optical disk just once through the pits altering the state of the material on the recording track. Thereafter, information can only be read from such a disk without the opportunity to again record different information in the same storage locations. There are developments of alternative kinds of optical disks which would permit such restoring of information.

Rather than adding additional storage and retrieving means in parallel to more quickly be able to store or retrieve information from an individual storage means such as a magnetic disk, there can be provided parallel disk drive systems or parallel database machines of a standard kind without necessarily adding increased numbers of storing and retrieving means in parallel in each. Instead, the plurality of such longer term storage arrangements can be operated in concert to provide storing and retrieving of information in parallel for the central processing unit of the computer system. However, such parallel data streams lead to extensive control requirements which can rapidly increase the cost of the system and can lead to a slowing of system operation.

As can be seen, reducing the expense of storing voluminous data for longer terms has yielded only to the use of data storage arrangements that permit access to selected ones of a plurality of storage sites therein only in a sequence which follows the sequential ordering of the storage sites along what is, or is analogous to, a single line path in that alterable state material in which the storage sites are provided. The desire to minimize cost for the storage of large volumes of information for relatively longer terms has lead to increased access times to selected portions of that information, which times have been reduced only through significantly increased expense undertaken in providing parallel operations in either the database machines or the computer systems being used.

Thus, overcoming the problem of reducing the time in which access to a storage site in a plurality of storage sites which are only available sequentially to a storing and sensing means, and often available sequentially only after a delay permitting the storing and sensing means to reach the sequence of storage sites of interest, has proved to be expensive. As a result, there is a strong desire for a database machine which can improve access times to storage sites which are available successively only in sequence, but without making such machines prohibitively expensive.

SUMMARY OF THE INVENTION

The present invention provides for storing and retrieving at storage sites in an alterable state material provided in a storage means multiple pluralities of discrete information representations each of which has discrete information representations which correspond to a discrete information representation in the others. Discrete information representations in stored-at preceding storage sites have corresponding representations in another plurality thereof or directly available subsequently, stored at storage sites that are first available or directly available subsequently, to be accessed for storing and retrieving from those preceding storage sites. There may be as many first or directly subsequent available storage site locations from a selected preceding storage site location as there are relationships from the digital information representation stored at the selected preceding site to other discrete information representations. These pluralities of storage locations may be in various kinds of alterable state media such as one or more magnetic disks, one or more bubble memory chips, or one or more optical disks. Plural alterable state media are synchronized in operation with one another.

BRIEF DESCRIPTION OF THE DRAWINGS

FIG. 2 shows an example of an information item or data item array,

FIG. 3 shows a representation of recording space passing a point in an alterable state recording medium, FIG. 6 shows the retrievable sequence associated with FIG. 5, FIG. 7 shows representations of magnetic disk storage means, FIG. 8 shows an alternative information item placement in alterable state media recording space, FIG. 14 shows a generalized flow diagram for the operation of the system of FIG. 1 having the processes of FIG. 13.

DETAILED DESCRIPTION OF THE PREFERRED EMBODIMENTS

Figure 1:
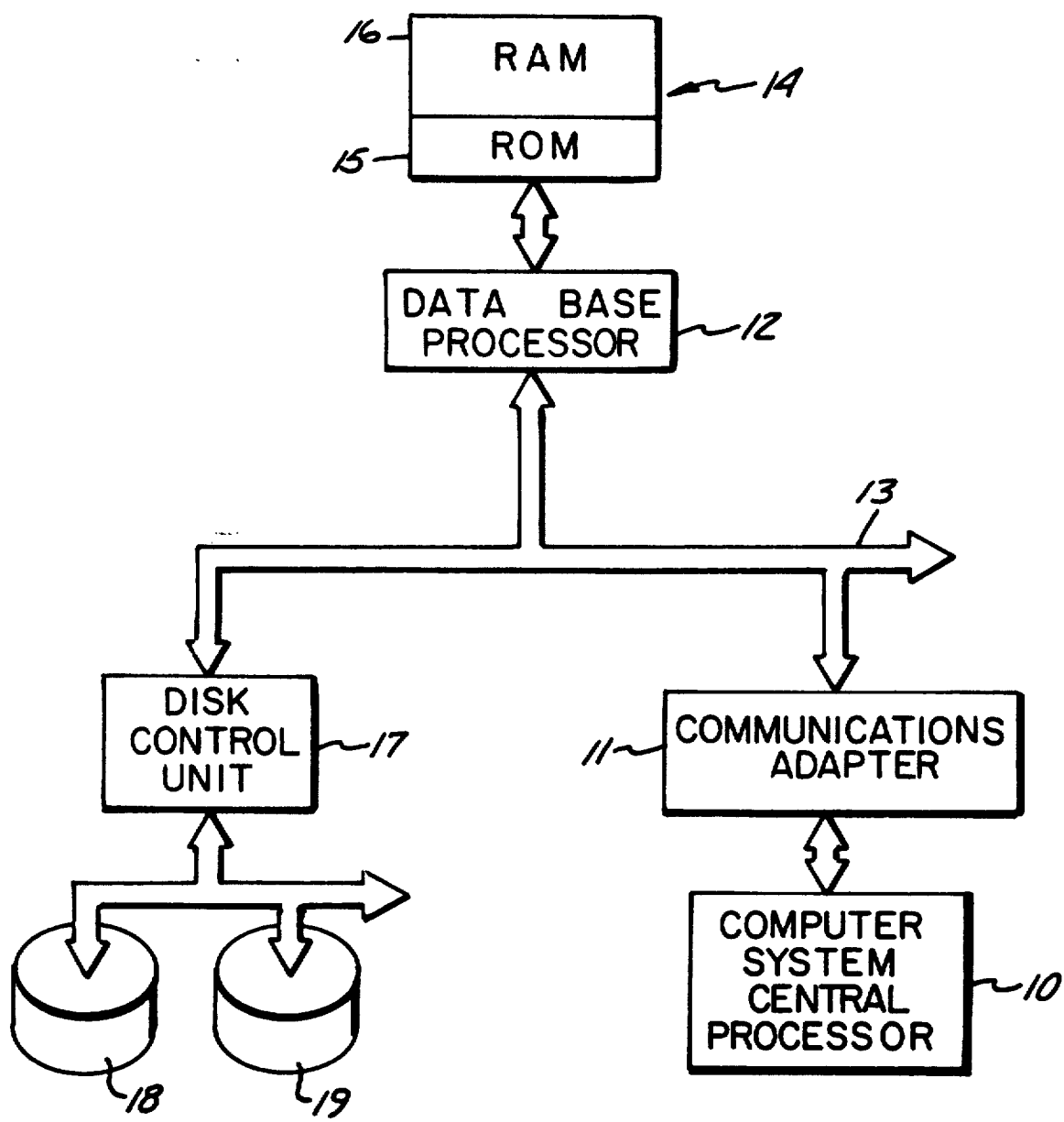
FIG. 1 shows a system block diagram using the present invention.

FIG. 1 shows a block diagram of a database machine as a portion of a computer system. The computer system has a central processor, 10, connected through a communications adaptor, 11, to the database machine control and data processor, 12, which is one of the control and data processors peripheral to central processor 10. Other peripheral devices, many or all having their own such peripheral control and data processors, will be connected to an input/output bus, 13, at points beyond the right hand arrow at which that bus terminates for purposes of FIG. 1. Communications adapter 11 and the input/output circuit interfaces of processors 10 and 12 under control of the respective processor construction programs form a channel over which commands and information or data travel between central processor 10 and database machine processor 12.

In addition, database processor 12 has a local memory, 14, comprising a read-only-memory (ROM), 15, and a random-access-memory (RAM), 16. ROM 15 has permanently provided therein initialization routines to initiate operation of the database machine of FIG. 1. RAM 16 has the various short term memory storage capabilities needed in operating this database machine with its instruction program.

Finally, processor 12 communicates over bus 13 with a magnetic disk control unit, 17, which controls the storing and retrieving of information items from one or more magnetic disk drive units, 18 and 19, and possibly more to the right of those shown.

An instruction program, or set of operating instructions, provided for database processor 12 controls the retrieving and storing of information in disk drives 18 and 19 under control also of disk control unit 17 as will be described below. The manner in which information received from central processor 10, or other sources connected to bus 13, is stored or retrieved from disks 18 and 19 can be made efficient in the time taken to do these operations if it is suitably chosen for the kind of data involved.

Consider information or data which can be arranged in tabular form, i.e. information or data items being arranged in a rectangular array of rows and columns. That is, there is a two-dimensional array formed of a plurality of strings of information items each having a sequential relationship among them, and a plurality of orthogonal strings of information items each having a sequential relationship among them. As indicated above, the storing of either rows or columns end-to-end in storage sites along recording tracks in the alterable state magnetic material in disk drives 17 and 18 leads to significant increases in the access time to these sites in some situation for storing changes to, or to retrieve selected ones of, these information items. For any given information item in such an array having been requested to be stored or retrieved, there is a substantial likelihood that a next item in the sequence along a row or the next item in the sequence below in a column will be part of the same request, or will also be requested, to be subjected to the same operation by central processor 10 or other device connected to bus 13. If the rectangular array is stored as rows end-to-end, as is typical, or as columns end-to-end along a recording track, then a request for the next item in a row or the next item in a column, respectively, will be quickly responded to as the storage site holding these information items will be the one next passing under the storing and retrieving head on the movable arm over the recording track.

If, on the other hand, the next request is instead for an information item in the same column but in the next row in a situation where the rows have been stored end-to-end along a recording track, there will be a somewhat greater delay until that row is reached further along the recording track. If, the request was to store changes to or retrieve all the information items in that column, there will be a much longer delay because, for a sufficiently large array, these information items will be stored across the several recording tracks needed to contain all of the rows end-to-end. The movable arm carrying the head must move track-to-track, on the basis of a relatively slow mechanical motion, and then must wait until the storage site containing the desired information rotates underneath this head.

Consider the partial rectangular array of representational information items shown in FIG. 2. In this array, the information items are designated $A_1$, $B_1$, $C_1$, $D_1$, etc., across a first row. Each of these information items, for example, can be of a different information type such as a name, an address, a telephone number, or other information items associated with the person named in column A. A different person's name would appear in the next row at $A_2$ and again in the next row at $A_3$, etc. Similarly, there would be associated addresses, telephone numbers, and the like in a row under the corresponding column for each such person. Thereby, a column of information types are formed, a name column, an address column, a telephone number column, etc. Every intersection of a row and a column in the rectangular array represents a cell having an information item contained therein (or several items if some are grouped in a column).

FIG. 3 shows a rectangular array representation of a portion of the recording surface space of a magnetic disk passing a point in time with there being shown a time axis indicating time points at which each of defined length storage site sectors along recording tracks begin to pass such a point. That is, there is a storage site sector of a defined length, i.e. by a distance or by the number of binary bit recording sites contained therein, between each specified time point in FIG. 3. The time between the beginning of a first storage site sector along a track coming beneath a head on a movable arm at a point and the time that the next storage site sector along the track begins to come beneath the head will be equal to $\Delta t = t_k - t_{k-1}$. This value, $\Delta t$, is constant for all recording tracks and defines the storage site sector width which is most conveniently defined by the number of bytes (eight binary bits) contained therein rather than a length measurement. A typical storage site sector width in bytes might be 4096 bytes (though other lengths can and will be used). Thus, for a circular magnetic disk, the binary bit recording sites in a storage site sector will be more densely packed on inner tracks than on outer tracks in this particular scheme. Hence, for all recording tracks the head will be at the beginning of a storage site sector in all such recording tracks including track n, at a specific time, say $t_k$, and will then be at the beginning of the next storage site sector in those tracks, including track n, at a time $\Delta t$ later, or $t_{k+1}$.

Consider now the situation in which the movable arm moves the head from being immediately over one recording track, n, to being immediately over the next adjacent recording track in the sequence, n+1. The storage site sector width can be chosen, for instance, to be sufficiently wide in time, $\Delta t$, or in the number of bytes contained therein, so that the arm movement time from track n to track n+1, or $t_m$, occurs within the time that a sector in track n in the absence of arm movement would have otherwise taken to pass beneath the head, i.e. $\Delta t$. Thus, $t_m \leq \Delta t$. In other words, the time for the head to move to change from one track to the adjacent track is taken to be less than or equal to the time in which a single sector can traverse from beginning to end underneath the head.

In many instances, the storage site sector width in bytes leading to a sector transversal time of $\Delta t$, will be chosen somewhat longer than the transition or movement time $t_m$ of the arm and the head from a recording track to the adjacent recording track. That is, the actual movement time might require only the time for 512 or 1024 bytes, or some other number, to pass beneath the head rather than the 4096 bytes that have been chosen to be placed in a storage site sector. Thus, even though the transition from a storage site sector having an information item stored therein to the next column information item could be shortened by having $\Delta t$ approximately equal to $t_m$ in the arrangement to be next described below, there can be other considerations leading to the choice of $\Delta t$ being substantially greater than $t_m$.

One of these considerations is that it may be more efficient for the situations where some of the information items are almost always requested together to also store them together. Thus, if the A column of the FIG. 2 array represents names and the B column represents addresses, and names and addresses are always requested together, there may be a decided advantage in storing each of these in the same sector to be read out together at once. As a result of such common sector storage, any requests from central processor 10 for information items which are along a column of FIG. 2, there would be significantly fewer column requests to be satisfied if some of the columns are in effect combined by placing their information items in the same storage site sector along a recording track in the disk.

Another consideration for common sector information item storage would be a desire to be certain, in a situation where there is storing of large documents, that the sector width is sufficiently large so as to be able to store an entire page of the document, which can greatly simplify determining where in such a document one is. This also further aids contextual sorting and makes easier the providing of complete pages onto a display screen upon such a request from central processor 10.

Figure 4:
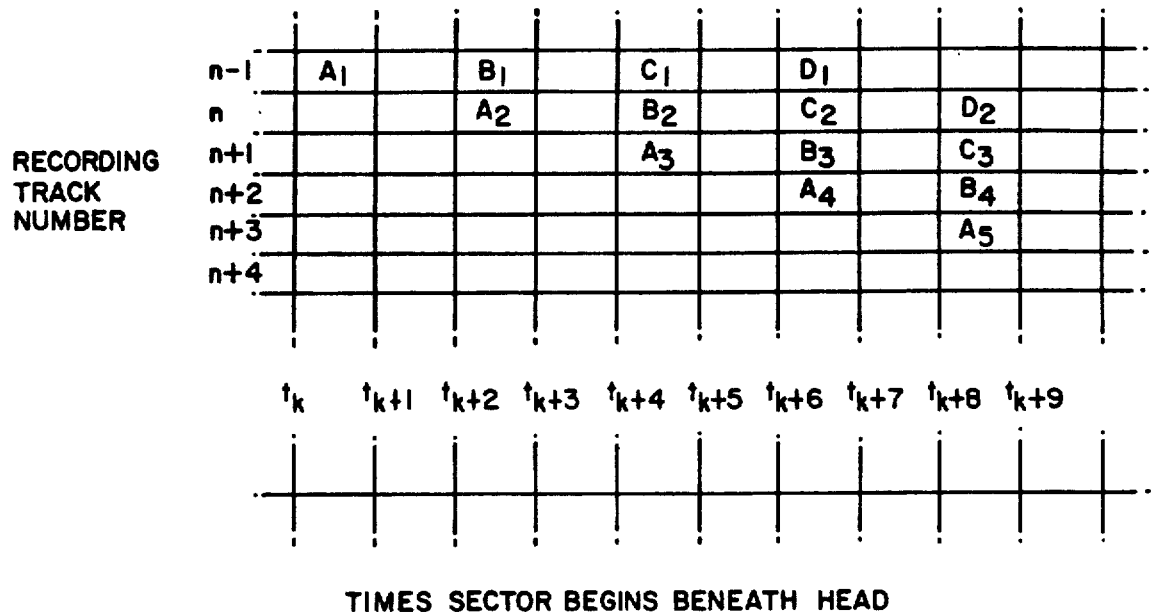
FIG. 4 shows placement of information items in an alterable state medium recording space.

As indicated above, the storing of either the rows or columns of FIG. 2 end-to-end along a recording track can lead to long access times in meeting certain requests for selected information items in the rectangular array shown in that figure. FIG. 4 shows a significantly better placement of the information items in the rectangular array of FIG. 2 into the storage site sectors of the disk storage space of FIG. 3. As can be seen, information item $A_1$ is put in a selected storage site sector of the disk space arbitrarily taken as track n−1, followed by what is shown to be a blank storage site sector. Item $B_2$ follows in the next storage site sector after the blank one in the same recording track, then another blank sector, and then item $C_1$ in the next sector of the same track next followed by a blank sector, etc.

Note, however, rather than as done in the table of FIG. 2, information item $A_2$ is not placed in a sector in an adjacent track immediately next to item $A_1$, but instead is placed in the adjacent track, track n, underneath or next to item $B_1$, and item $A_2$ is again followed by a blank sector in that same adjacent track. Clearly, $A_2$ is also not placed at the end of the row having $A_1$ as the first information item thereon as has been typically done in the past. Again, item $B_2$ is placed next in the same recording track n after the blank sector after $A_2$, item $B_2$ again being followed by a blank sector and then by information item $C_2$, a blank sector, etc.

Again, information item $A_3$ is shown in the next adjacent recording track, $n+1$, on the disk but placed beneath or next to information item $B_2$ rather than being beneath either of information items A, or $A_2$. This pattern is continued as can be seen in FIG. 4.

The result of this skewing or offsetting of columnar data from the information item rectangular array of FIG. 2 in the storage site sectors of adjacent tracks in the disk recording space of FIG. 3, as shown in FIG. 4, is that, relative to any particular information item, the next item below in a column is approximately as available in time to be read as is the next information item in a row. Thus, if information item $A_1$ has been requested and read out so that the head is at the end of the storage site sector containing that item, a continuing or following request to read out either of information items $B_1$ or $A_2$ can be approximately fulfilled in the same amount of time to thereby complete the response (or the next part of the response). This is because the time for the blank storage site sector following that sector containing information item $A_1$ in track $n-1$ to pass beneath the head is greater than or equal to that time required for the arm to move the head to the adjacent track.

As a result, information item $A_2$ can be available to the head at approximately the time that information item $B_1$ is available. In these circumstances, with the assumption that in most information retrievals either a row of information items from the array of FIG. 2 or a column of information items from the array of FIG. 2 will be requested, the database machine of FIG. 1 having the array of FIG. 2 stored as shown in FIG. 4 will be substantially equally responsive to either a complete information storage or retrieval row request or a complete column information storage or retrieval request in the amount of time taken to satisfy that request from central processor 10 or other device on bus 13. Thus, each item in a column is placed on an adjacent track in the sector or storage site which would be next available to be read by the head after reading the previous column entry. The head can thereby read the next item in a row or the next item in a column directly without passing over sectors containing information items which are not to be read.

The blank sectors shown between the information items in FIG. 4 may seem to be such as to cause a halving of the information storage density for the disk. However, other rectangular arrays can have their information items stored in these sectors shown blank in FIG. 4 in an interleaved manner. For that matter, some of the remaining portion of the rectangular array of FIG. 2 not shown could be interleaved in these sectors shown open in FIG. 4. Thus, no loss of information storage density is necessarily implied by the information recording arrangement shown in FIG. 4.

On the other hand, the blank sectors interposed in the tracks of FIG. 4 do reduce the retrieval rate of FIG. 2 row information items along recording tracks. That is, if information item $A_1$ is read out and the subsequent request from central processor 10 is to then read out information item $B_1$, there is an added delay in meeting this request because of the time it takes the blank sector between the sectors containing information items $A_1$ and $B_1$ to traverse underneath the head. In fact, the further insertion of blank storage site sectors next to those already present between storage site sectors storing row information items allow an arbitrary slowing of the row information items along a recording track. In the other direction, eliminating all of the blank sectors by moving the row information items to the left along the tracks except the first item, or the A column items in each track, will double the row information item retrieval rate without affecting the column retrieval information item retrieval rate. That is, the head in changing to an adjacent track to obtain the next column information item still will be placed over the next available storage site sector in that adjacent track after $t_m$ has elapsed.

Figure 5:
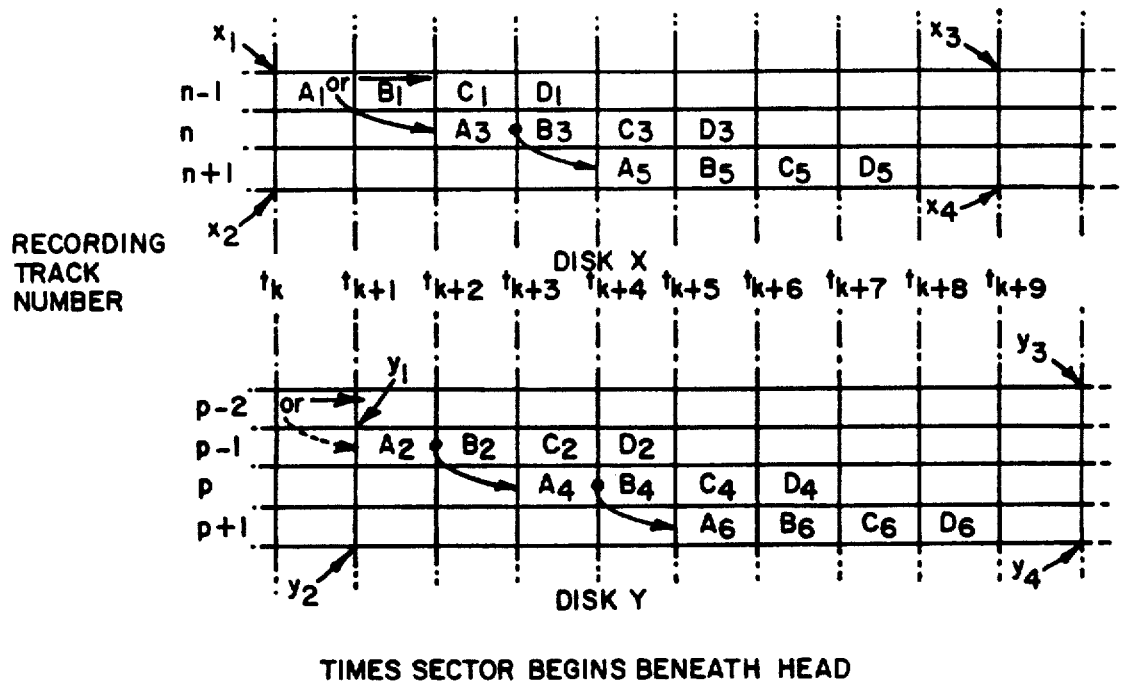
FIG. 5 shows an alternate placement of information items in alterable state media.

An alternative exists which again doubles the row information item retrieval rate but also simultaneously doubles the columnar information item retrieval rate by storing the information items in a rectangular array of FIG. 2 onto two magnetic disks in the manner shown in FIG. 5. There shown are two disk recording space representations for a magnetic disk x and a magnetic disk y which are rotated together in synchronism so that a common set of time points can be used to represent the starts of sectors in each in FIG. 5. As can be seen, the rows having odd numbered information items are stored on disk space representation x with the same columnar positions with respect to the items of one another that they had in the arrangement of FIG. 4 (e.g. item $A_3$ is next to item $C_1$ again). That is, an information item in one odd numbered row is underneath the columnar information item of the preceding odd numbered row two columns to the right of its own columnar type of information in that preceding odd numbered row. Similarly, each even numbered row is shown on disk space representation y shifted two columns to the right from its same columnar information type under its preceding even numbered row (e.g. $A_4$ is next to $C_2$ again), thereby maintaining the same relationship between information items that those rows had in the arrangement of FIG. 4.

In operation, consider at time $t_k$ that the head associated with disk x is located over track $n-1$ while the head associated with disk y is located at this same time over recording track $p-2$. The head for disk x can directly read the row having information items beginning with $A_1$ just as it could in FIG. 4 if it had been located there in track $n-1$ at time $t_k$. On the other hand, if column A was to be read, information item $A_1$ would be first read by the head associated with disk x followed by information item $A_2$ being read by the head associated with disk y, and so on back and forth. Each head will be able to retrieve the next columnar information it is to provide from the first available storage site sector available to it after its tm has elapsed at each track change to an adjacent one. Since no open sectors are provided in any rows in either disk x or disk y, there are no added delays in retrieving (or storing) any information item row in either disk which improves the row retrieval (or storing) request response time over that of FIG. 4 by a factor of two. Since there are two disks which can each retrieve row information items in parallel with the other, the total row information item storage or retrieval rate is again doubled or quadruple that of FIG. 4. The same columnar retrieval request response time will occur for readings from either disk x or y individually, as would occur in the arrangement of FIG. 4, but taken together the total columnar response time for the two will again be one-half that of the arrangement of FIG. 4 as each disk provides a columnar information item output while the arm of the other is moving from one track to the next adjacent track. This sequence is shown in the curved arrows depicted in FIG. 5 with the resulting outputs shown in FIG. 6. Thus, the response time for columnar information item retrieval or storing requests in the arrangement of FIG. 5 will be just one-half of the corresponding response time for the arrangement of FIG. 4, and will be just one-fourth of the raw information item requests.

As in the arrangement of FIG. 4, the arrangement shown in FIG. 5 permits the database machine system, after having retrieved an information item at any storage site therein, to directly retrieve either (1) the next row item in the corresponding row sequence in FIG. 2 along the same recording track in the next sector, or (2) the next columnar item therebelow in the corresponding column sequence in FIG. 2 in the next adjacent recording track directly without a disk having passed fully under its read head some other storage site containing some other information item and without waiting for a disk to turn a full circle so that storage site can come around again. Of course, there is the possibility of storing the next information item in a column of FIG. 2 in a storage site somewhat further along the next adjacent track than the storage site first available to the head in that track. That is, in either of FIGS. 4 or 5, information item $A_2$ could be shifted further to the right with respect to information item $A_1$ which would still permit direct access without a full disk revolution after retrieving information item $A_1$ to retrieving information item $A_2$ but with an additional delay. Such a delay could possibly be advantageous in some situations in which further activities being carried on in the computer system as a whole would benefit from such a delay.

FIG. 7 shows a view of the alterable state magnetic material surface of magnetic disks x and y corresponding to the disk storage space representations x and y in FIG. 5 (which, as previously indicated, could instead be optical disks). A selected portion on each of the disks bounded by two sector lines and two radii have been set out. Light arcs drawn within these bounded regions are used to represent, though greatly out of scale with the actual, recording tracks along the surface of the disk. Darkened short arc segments along these light line arcs are used to represent the storage site sectors in the alterable state magnetic material at which the information items set out in FIG. 5 are stored (they are shown separated by spaces though they would not be in practice where they are separated by coding representations in the stored bits). The disk recording space representation for disk x in FIG. 5 has a rectangular portion marked out by the designators $x_1$, $x_2$, $x_3$ and $x_4$. A similar designation is made for the disk recording space representation in FIG. 5 for disk y using the designators $y_1$, $y_2$, $y_3$ and $y_4$. Those same designators are used for disk x and shown at the corners of the selected bounded region of that disk in FIG. 7, and the designators for disk space y are shown at the corners of the selected boundary region on disk y in FIG. 7. Thus, the upper left hand darkened line segment on disk x in FIG. 7 represents the storage site sector for information item $A_1$ while the next adjacent recording track toward the center of disk x has its left hand darkened arc segment representing the storage site sector for information item $A_3$ and so on. Similarly, the upper left hand darkened arc segment for disk y represents the storage site sector for information item $A_2$ while the left hand darkened arc segment in the next adjacent recording track toward the center in disk y represents the storage site sector for information item $A_4$.

Thus, the representation of disk recording space in FIG. 5 is shown in a corresponding physical space representation in FIG. 7 on magnetic disks x and y. Moving arms, 20 and 21, each having a storing and retrieving head means affixed thereto, can be positioned over each of the recording tracks present on their respective disks x and y, including those recording track segments shown in the selected bounded regions on each of these disks.

FIG. 8 shows extending the concept of FIG. 5 to three disks, disks X, Y and Z. Again, the curved solid line arrows represent the assumption that the time $t_m$ before the movable arm with the head can transfer from one recording track to the adjacent recording track is less than or equal to the time required for a storage site sector to pass underneath a motionless head, $\Delta t$. As such, the solid line arrows extend over one storage site sector transversal time in FIG. 8. Except for the initial transfer to the first information item storage site sector on each disk, there is a sector transversal time of waiting between the end of a solid line curved arrow representing the completion of a head transfer from one track to an adjacent track in each disk, and the beginning time of the next information items storage site sector reaching the head. This is indicated by the w with dashed lines on either side thereof representing a waiting state during the transversal of that storage sector site underneath the head before reaching the first information item storage site sector along this adjacent track.

The addition of further magnetic disks in the manner of FIG. 5 but even more than two, whether on a single drive with independently moving arms with heads for each such added disk or on multiple disk drives, can serve several purposes. Clearly, information items can have more complex relationships than just with nearest neighbors in a two-dimensional array. As an example, information items can be conceived as being arranged in cells of a rectangular solid formed as a succession of rectangular arrays along a third dimension. Then each information item in a cell can be viewed as having an adjacency relationship with nearest neighbors along six different directions, i.e. each information item could be thought as being a member of three different sequences of information items with these being a row sequence, a column sequence, and a depth sequence. Even further, an information item could be considered as a cell in a higher dimensional solid so that an even greater number of sequential relationships with other information items would exist.

Each rectangular array making up such solids can clearly be provided for in the arrangements described so far. That is, a single disk could be provided for each such rectangular array as in FIG. 4, or several such angular arrays could be provided on a single disk. Again, each such rectangular array forming such a solid could be provided for on a pair of disks in the manner of FIG. 5, or again several such rectangular arrays could be provided on the same pair of disks. The information item placement in storage sites on such disks would be analogous to the information item placements shown in FIGS. 4 and 5, respectively.

The use of additional disks in the sense of FIG. 8, again whether on a single disk drive having independent moving arms for each such disk or on plural disk drives, is shown for a different purpose than storing information items having higher dimensional sequential relationships with neighboring information items. The arrangement of FIG. 8 allows for adjusting the rate at which row information storage site sectors or column information storage site sectors can be accessed for storing therein or retrieving therefrom such information items. Before considering FIG. 8 again, remember in FIG. 4 that the blank storage site sectors after each item in a row of storage site sectors occurred because of the (a) desire to have the row storage or retrieval request response time be approximately that of the same column response time, and (b) the time $t_m$ for an arm and head to move from one track to an adjacent track was set to be less than or equal to the time $t$ for a sector to pass beneath a motionless head.

Thus, after storing or retrieving information item $A_1$ at its storage site in FIG. 4, the system can store or retrieve the next one in the row, information item $B_1$, or the next information item in the column below, item $A_2$, in approximately the same response time. However, removing these blank sectors by moving each row item after the first to the left sufficiently to eliminate the blank storage site sectors, will lead to no change in the rate at which column storage or retrieval request responses are made since the relative skew is unchanged but will halve the time for row storage or retrieval request response times. On the other hand, adding additional blank storage site sectors to the right of each of the existing blank storage site sectors in FIG. 4 will again leave the column storage or retrieval request response time unchanged, as there is no relative skew change, but will lengthen the row storage or retrieval request response time.

Similarly, inserting a blank storage site sector (or one with unrelated interrelation) between each information item containing storage site sector in the row in FIG. 5 will leave the column storage or retrieval request response time unchanged in the absence of a skew change but will lengthen the row storage or retrieval request response time. On the other hand, the arrangement of FIG. 5 was introduced, as described, to reduce the row request response time by eliminating the blank storage site sectors between row storage site sectors having information items therein while also reducing the columnar request response time by having the system store or retrieve columnar information items alternately at appropriate storage site sectors on disks X and Y.

As indicated, the arrangement of FIG. 5 allows for an even greater increase in row store or retrieval request response time since a row of information items from each of disks X and Y can be stored or retrieved in parallel in the same amount of time, thereby doubling the rate at which row information items are handled by the system (they may be placed in a buffer memory to avoid conflicts at the database machine output. The head associated with disk X having completed reading the storage site containing information item $A_1$ this head can next read the storage sites containing $B_1$, $C_1$ and so on while the head associated with disk Y can begin retrieving information in the row beginning with the storage site sector containing information item $A_2$, then $B_2$, and so on. Thus, adding a second disk in the arrangement of FIG. 5 can reduce both the column and row read request response times.

Clearly, FIG. 8 will allow three rows of information items to be stored or retrieved in parallel and so at the same time thereby decreasing further the row storage or retrieval request response time, again without changing the columnar storage or retrieval request response time since relative skew is again unchanged. A further possibility appears in connection with FIG. 8 because of the waits which are introduced if the movable arm and head must complete a move from one recording track to an adjacent recording track in a time $t_m$ less than or equal to $\Delta t$ taken to have a storage site sector pass beneath this head. The dashed line arrows show that if the time for a movable arm and head to change from a recording track to the adjacent recording track takes two storage site sector transversal times, that is, 2 $\Delta t$, that there will be no effect on the columnar storage or retrieval request response time and no significant effect on the row request response time. Thus, if $t_m$ is less than or equal to 2 $\Delta t$, rather than $\Delta t$, the system will operate about as it did.

This suggests that the storage site sectors can be of a shorter length (containing fewer bytes) which will thereby increase the rate at which information items are retrieved from each such storage site sector (there will be twice as many of them) if the information items are containable in this relatively shorter length. That is, the storage site sectors need not be increased in length to meet the requirement that $t_m$ be less than equal to $\Delta t$, a length which may leave considerable unused space in each, but need only be of a length so that the requirement $t_m$ is less than or equal to 2 $\Delta t$ be satisfied.

The other possibility suggested is to increase the rotational rate of the magnetic disk leaving the storage site sectors of perhaps the same length so that two of them will pass by during a movement of the arm and head from one recording track to an adjacent track. Increasing the rotation rate is likely to be much easier than increasing the placement rate of the arm and head from one recording track to the other because of head placement system limitations, and so this permitting of an increase in the rotation rate of the magnetic disk could again lead to decreased row and column read request response times. However, most drives will always be operated at the maximum rotational rate possible and so this suggestion may not be easily useable.

Figure 9:
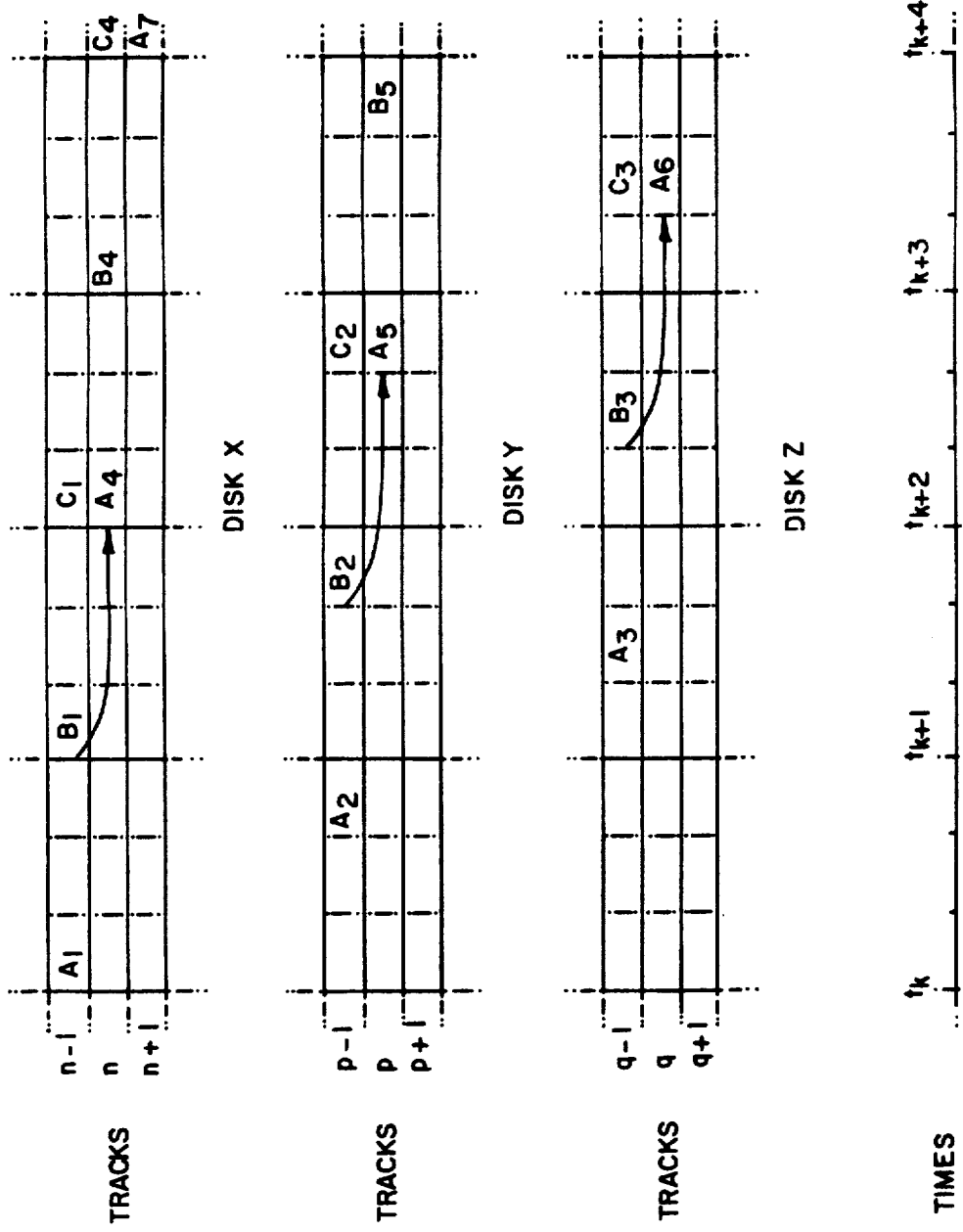
FIG. 9 shows an alternative information item placement in alterable state media recording space.

Another possibility for eliminating the waits occurring in FIG. 8 if $t_m$ is kept less than or equal to the sector transversal time is to change the relative skew between the rows as shown in FIG. 9. The skew has been changed from one full storage site sector width to two-thirds of a storage site sector. This is possible because each disk can be operated as chosen with respect to the others, as they are independent units, and each to the sector transversal time. A further benefit in the arrangement of FIG. 9 is the increase in the columnar storage and retrieval request response rates as these information items can be, for instance, retrieved in the time taken for retrieving two items in the arrangement of FIG. 8. A skew change to one-third of a sector would work and provide an even greater improvement or columnar request response time.

Figure 10:
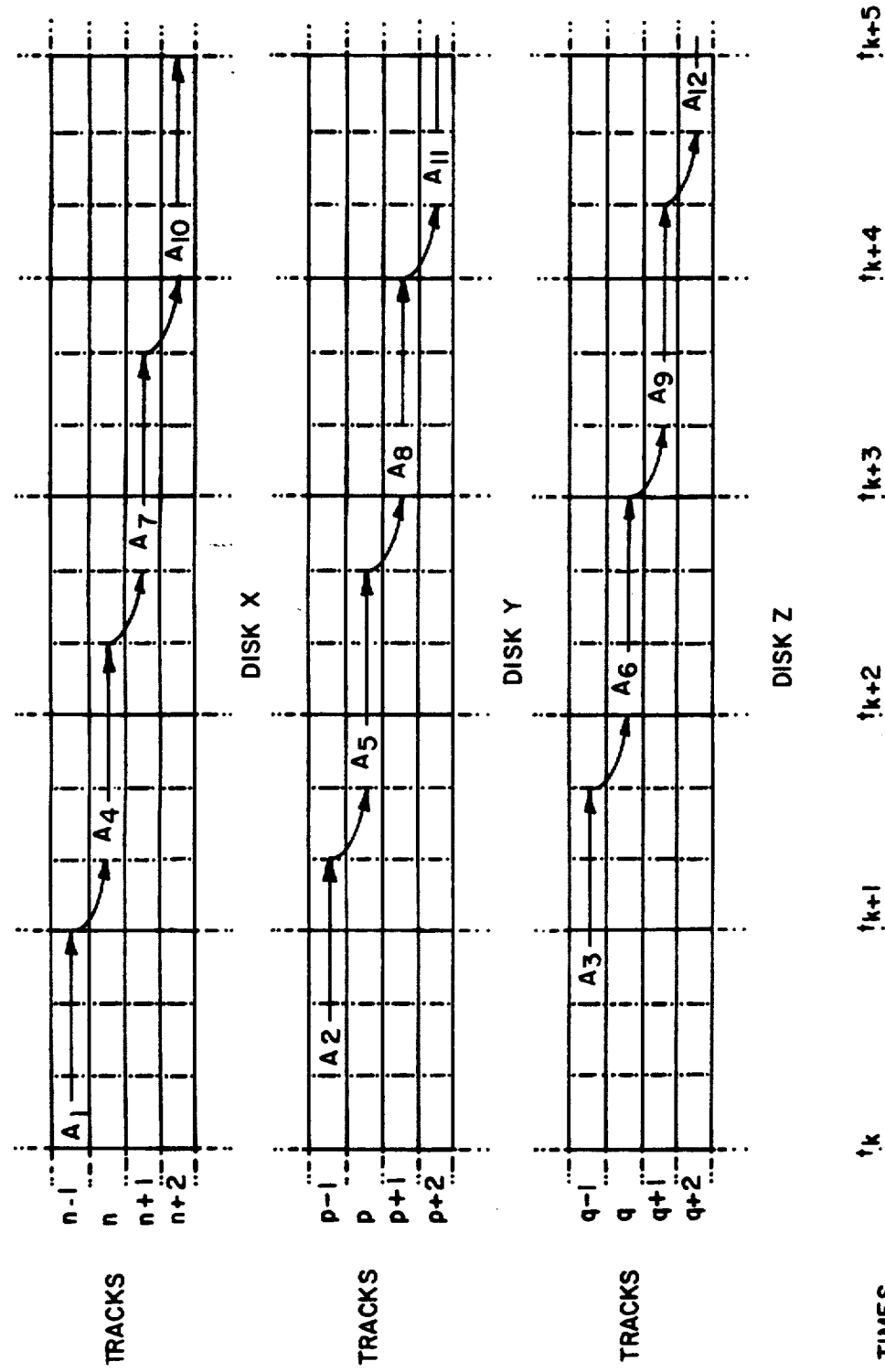
FIG. 10 shows an alternative information item placement in alterable state media recording space.

A similar change in relative row skew is also useful if the sector lengths, and so transversal times, are chosen to be much larger than the arm movement time, i.e. time $t_m$ is much less than $\Delta t$. FIG. 10 shows an arrangement satisfactory for $t_m \leq t/3$ where three disks can be used with a skew of one-third of a storage site sector. Only the first information item of each row has been shown. Here too, the columnar information item request response time is reduced significantly.

Note that the use of independent disks allows the change in skew to be such that there is zero row skew—all row request responses can be done fully in parallel. The retrieval results, for instance, can be placed in a memory buffer and sorted into proper sequences by the buffer control circuitry when passed to the communications channel.

Figure 11:
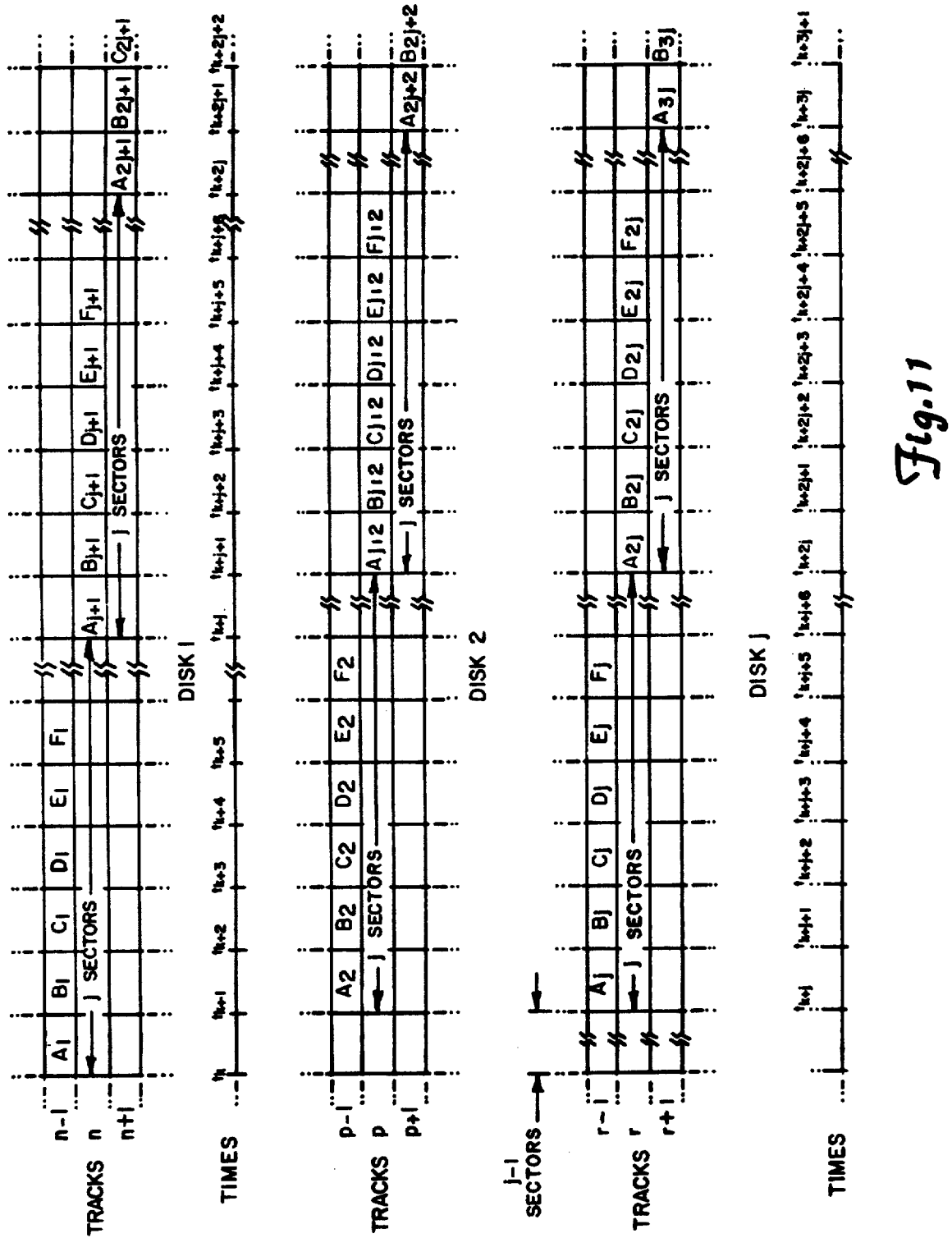
FIG. 11 shows an alternative information item placement in alterable state media recording space.

This addition of disks, whether on the same spindle of a single disk drive with independent moving arms and heads for each such disk or on multiple disk drives, can be extended arbitrarily within economic limits and the ability to accommodate data flows. This is shown for j disks in FIG. 11. The advantages described for the arrangement of FIG. 8 over the systems in FIGS. 4 and 5 are enhanced further by the additional magnetic disks present in the arrangement of FIG. 11. Again, the relative skew can be changed to improve the columnar information item request response times.

Figure 12:
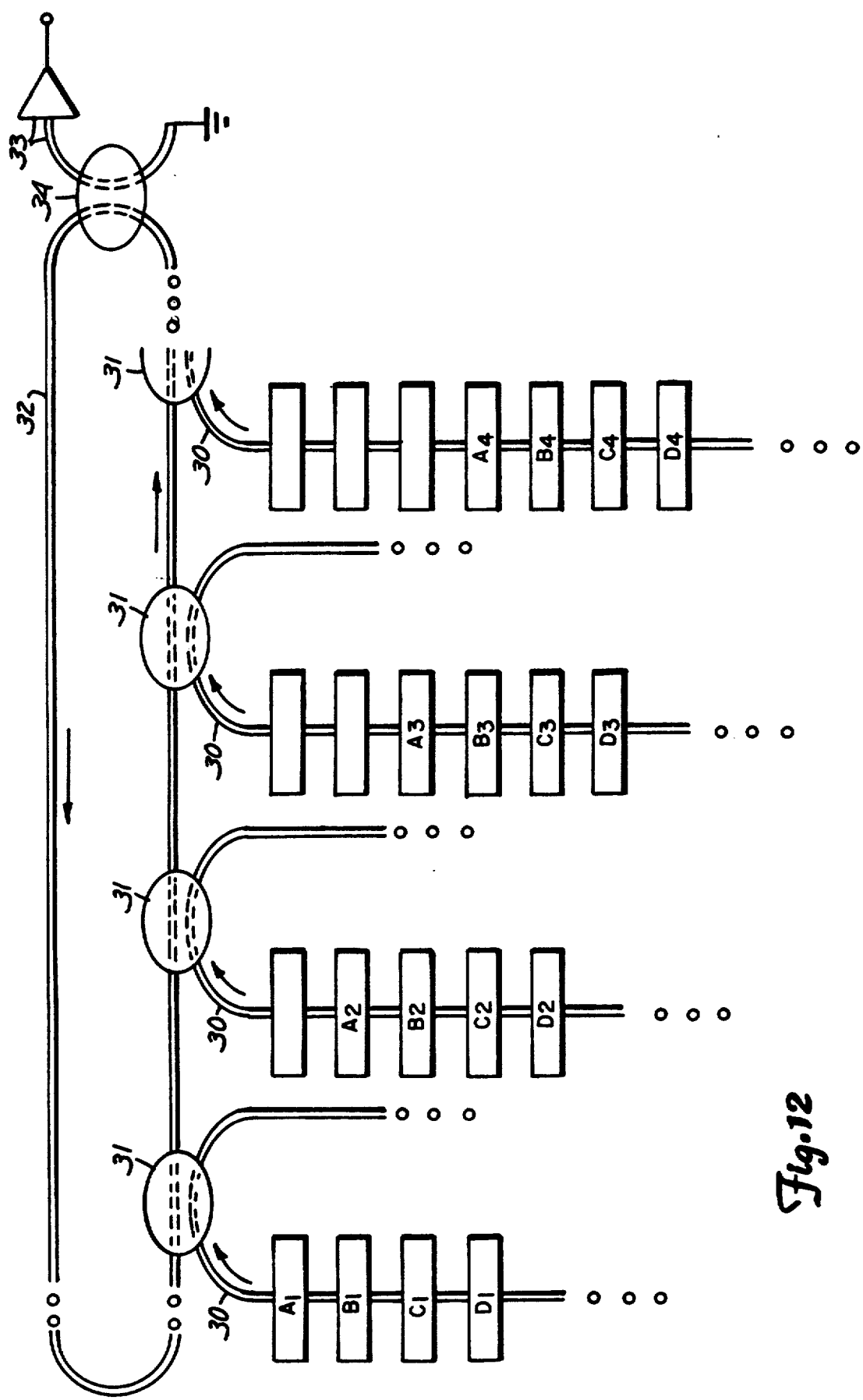
FIG. 12 shows a representation of a bubble memory device.

The arrangement, described above in various forms, having (i) row information items from the rectangular array of FIG. 2 accessible along a preceding sequence of storage sites, and having (ii) next in order columnar information items stored in that storage site in an adjacent set of sequential storage sites such that a columnar item is in that storage site first available from the storage site in the preceding sequence storing the preceding columnar item, can also be implemented in memory structures other than magnetic disks. For instance, bubble memory storage devices can be operated as direct analogs of magnetic disks. FIG. 12 shows a portion of such a bubble memory storage device having a series of sector tracks, 30, along which magnetic bubbles can be propagated under the control of applied magnetic fields as indicated above. Each of these sector tracks is coupled at a transfer station, 31, to a track loop, 32. Track loop 32 is connected to a sense amplifier arrangement, 33, through a further transfer station, 34. The presence or absence of small magnetic domains, or "bubbles," in sectors 30 is used to represent information items.

In FIG. 12, a segment of a string of a fixed number of bubble positions uses bubbles, or absences thereof, in that string segment to represent each array information item. Such string segments are represented as rectangles along the sector tracks. The rate at which bubbles are propagated around each sector loop 30 is such that for the passing of each sector loop string segment into a transfer station 31, all of the bubbles in track loop 32 will be completely propagated thereabout. Bubbles in the track loop lead to an electrical signal at the output of sense amplifier arrangement 33.

As can be seen, the string segment of bubbles representing information items $A_1$ are shown adjacent to the transfer station 31 in the left-hand sector loop 30. The remaining items in that row from the rectangular array of FIG. 2 are also present as successive string segments in that sector loop. Similarly, the information items in the next lower row in the rectangular array of FIG. 2 appear as the series of bubble string segments in the adjacent sector loop 30 next to the right, but skewed back from the transfer location 31 there by one string segment. Continuing on to the right, the remaining information items from the successive rows of the rectangular array in FIG. 2 appear in successive track sectors 30, each skewed back one string segment further.

Hence, after an information item is transferred from a sector loop 30 to track loop 32 and then transmitted onto sense amplifier arrangement 33, the next available information item from the rectangular array of FIG. 2 which can be placed on the track will be either (i) the succeeding information item in the same row of the array and next along the sector loop 30, or (ii) the next information item downward in the column of the array which is also the next one to go to the transfer station 31 in the adjacent right-hand sector loop 30. Thus, once again, either the next row information items from the rectangular array of FIG. 2 or the next columnar information items can be stored or retrieved by the system of FIG. 12 after having retrieved any particular information item in that array from this bubble memory device system.

Returning now to the rectangular array of information items of FIG. 2 and how they should be stored in an alterable state material in a storage means which permits only sequential access to the storage sites in that material, the foregoing has shown that storing either the rows end-to-end or the columns end-to-end of that array leads to information item storage or retrieval request response times which are, at best, reasonably short for requests which relate primarily to either rows or columns but not both. The alternative storage arrangements described above provide information item storage or retrieval request response times which are reasonably short for requests related primarily to either rows or columns or both. Another way to view these results is to describe the array of information items a set of row information item sequences, or as a set of columnar information item sequences as follows:

$$Array = \{Rows\} | \{Columns\}$$

where {} denote set and the vertical bar means "or."

Data processing operations on such an array, representing tabular data, will proceed either row-by-row or column-by-column depending on how the array was stored. Thus, such an operation on the array, designated by P, can be viewed as operations, $\beta$, on the columns or operations, $\pi$, on the rows so that the array operator P in its most basic form can alternatively be expressed as follows:

$$P(Array) = \pi\{Rows\} | \beta\{Columns\}$$

quite commonly, array data is actually arranged by rows so that the second of the last pair of equations represents what is typically done in conventional data processing.

As indicated in the foregoing, the database component of the computer system of FIG. 1 is to be capable of performing either the row operations or the columnar operations represented in the last pair of equations, with comparable performance in terms of operation response time or, if not substantially equal, to perform them with response times that are chosen by design rather than times that are forced by the manner in which the information items are stored in the alterable state material of the storage means, i.e. the database component. By having this capability to choose either row or column operations, any particular complex operation P on the array can have the basic operations on the rows and operations on the columns combined in such a manner so as to reduce the overall time necessary for the array operation P to thereby give an optimum result in reducing the time duration for doing so.

The optimum array operator, designated P', can then be written, assuming that the individual row and column operations are time efficient taken by themselves, as follows:

$$P'(Array) = \pi_1\{Rows\} \cup \beta_1\{Columns\}$$

That is, the optimum array operation will be a union of some subset of the available row operations, $\pi_1$, and of some subset of the available column operations, $\beta_1$, which together provide the best of each kind of such basic operation to give a minimum time or optimal complex array operation P'.

The last equation indicates that a combination of basic operations on rows followed by basic operations on columns, or vice versa, or a mix thereof, are the basis of yielding an optimum complex operation on the array information items. Additional complex operations on the array, or a single array operation of a more complex nature, can be represented by a series of such optimal operations, say $P'_A, P'_B, \ldots, P'_N$. However, even if the individual row and column operations are time efficient, there will be time inefficiencies if there are limitations in the ability of the storage means to operate on row sequence storage sites and then on column sequence storage sites, or vice versa, because of the nature of the availability of these sequence storage sites due to the position in which the head finds itself at the end of a particular operation with respect to the next basic operation. Thus, if the order in which the basic operations are carried out is altered from the order in which they are first presented (arrival sequence) to thereby achieve time minimization though accomplishing certain selected basic operations earlier than the way first presented, the overall time taken to complete commands or requests may be reduced.

The last equation above can be rewritten to make the operations in the set explicit in some order as follows:

$$P'(Array) = (v_1, v_2, \ldots v_n, h_1, h_2, \ldots, h_m)$$

where v represents a columnar operation and h represents a row operation. If many complex array operations are commanded, or requested, to be performed on the array without any specified order, the equation would instead be written:

$$\{P'(Array)\} = \{(v_1, v_2 \ldots h_m)_A, (v_1, v_2, \ldots h_m)_B, \ldots, (v_o, v_2 \ldots h_m)_N\}$$

As stated, some base operations reordering is to be considered with respect to the arrival ordering in these last equations as presented for further minimizing time since going from any one of these basic operations to the next set out in this presentation may be time inefficient for the storage means. Therefore, a further optimization constraint is imposed expressed as follows:

$$\{P'(Array)\} Optimum = Reordered\ set\ of\ \{P'(Array)\}$$

The storage means, or the system database component, in making use of the previously described storage arrangements, performs the following functions: (i) parses the command, or request, of a complex array operation to the database component from other parts of the computer system into its basic vertical and horizontal operations, (ii) repeatedly reorders them, in effect, for time efficiency if possible, and (iii) executes each of the operations in the order set. One method to keep track of intermediate results of selected basic operations occurring during the performance of the array operation is to use an access path vector:

$$\alpha = a_1, a_2, \ldots, a_n\ where\ a_i = \{0,1\}$$

Continuing with the row oriented array organization where a row of FIG. 2 corresponds to a recording track in a magnetic disk, this access path vector has its elements $a_i$, there being one for each row in the array, indicating which rows of the array remain under consideration given the basic operations performed thereon at that point in the array operation. The indication is provided by the corresponding vector element having a value of one. The vector element having a value of zero indicates that row has been eliminated from further consideration in connection with the complex array operation.

A typical command or request from central processor 10 or other unit connected to bus 13 in the system of FIG. 1 might be to review each row in the table to see that it meets a particular set of qualifying criteria, and then provide selected items of information in those rows which qualify. If the assumption is made that qualification requires u columnar basic operations, the operations sequence might be as follows:

(i) Initialize access path vector by making all elements thereon equal to one;

(ii) Perform a set of u columnar operations of the following form where $0 \leq v \leq u$:

$$\alpha(v) \leftarrow \beta_v(\alpha(v-1), column\ w)$$

[final access path vector indicates that c rows have been selected as meeting the qualification];

(iii) Perform a set of c row operations.

The order of the columnar operations and of the row operations would be chosen to minimize the time taken by the entire array complex operation subject, as indicated, to the columnar operations being completed before beginning the row operations.

A typical series of steps under this sequence in somewhat more detail could be depicted as follows:

| | |
|---|---|
| $\alpha(0)$ | 1 |
| $\alpha(1)$ | first criteria applied to appropriate column to determine rows meeting this criteria |
| $\alpha(2)$ | second criteria applied to the appropriate column to determine the rows meeting this criteria, and first criteria having been met |
| $\alpha(u)$ | [Completion of columnar operations] |
| Output (1) | first selected column information for qualifying row, second selected columnar information for qualifying row, etc. |
| Output (2) | first selected column information for next qualifying row, second selected columnar information for qualifying row, etc. |

-continued

```
Output (c)
    [Completion of the row operations]
    .
    .
```

In the foregoing steps, the corresponding access path vectors which result might be something like the following:

$a(0) = 1,1,1,1,1,1, \ldots ,1,1$ $a(1) = 1,1,0,0,1,0, \ldots ,0,1$ $a(2) = 0,0,0,0,1,0, \ldots ,0,1$ Thus, the last access path vector would have ones for each element for which a corresponding row met the qualification criteria.

The output operations in the foregoing process, designated by an Output (d) where $0 \leq d \leq c$, provide the selected ones of the various kinds of possible information items under the various columns for those rows which have met the qualification criteria. Thus, if column A is a sequence of person's names, the selected kind of information for that person might be the person's address, telephone number, salary, etc. However, the storage means may not bring these selected information items for each row out in the same order in which the rows appear in the array of FIG. 2 in the interest of minimizing time to extract the information items. That is, if at the end of the columnar operation the head over the magnetic disk is in a location at which storage sites contain information items which are relatively close to bottom of the columns in the array of FIG. 2, the rows meeting the criteria which are closest to the head at that position will also presumably be near the bottom. The storage means will provide these information items for those lower rows first to save retrieval time. Thus, the optimal response to a retrieval request would be met in this manner by the storage means.

As a more specific example, consider a situation offering a retirement incentive to senior staff employees of a business (those making more than $35,000/yr) who will be eligible to retire if they worked for more than 25 years (hired before 1962). The following employee table will be the basis of this example:

| Row | Name | Address | Salary | DOH |
|---|---|---|---|---|
| 1 | Jeanne | 106 Smetana | 35 | 1980 |
| 2 | Maria | R.R. 2 | 55 | 1959 |
| 3 | Kiki | 1004 7th | 25 | 1985 |
| 4 | Greg | 924 Sierra | 20 | 1987 |
| 5 | George | 7100 Dresser | 51 | 1958 |
| 6 | Vlad | 123 Pearly Gate | 5 | 1975 |

A complex array operation command in this situation can be the following:

| | |
|---|---|
| Select | Name, Address |
| from | Employee - information table |
| where | Salary > 50 |
| and | Date of hire (DOH) < 1962 |

The steps in this specific sequence are as follows:

```
(0)  1
(1)  Salary ≥ 35
(2)  (DOH ≤ 1962) AND a(1)
Out [1]  name [5], address [5]
Out [2]  name [2], address [2]
    .
    .
```

As a result, the following access path vectors are generated:

| | | | | | |
|---|---|---|---|---|---|
| 1 |  | 1 |  | 0 | |
| 1 |  | 1 |  | 1 | row 2 |
| 1 | then | 0 | and finally | 0 | |
| 1 |  | 0 |  | 0 | |
| 1 |  | 1 |  | 1 | row 5 |
| 1 |  | 0 |  | 0 | |
| a(0) |  | a(1) |  | a(2) | |

$a(0)$ is initialized to a unit vector. At the end of the first columnar operation applying the salary criterion, the intermediate access path $a(1)$ vector indicates three still qualified rows, 1, 2 and 5 remain. This result is continued to be required and the further DOH criterion is also applied to produce $a(2)$ which indicates that rows 2 and 5 are the final rows found qualified. At this point, the row operations can start. Note that we have a choice of passing on as the output the selected portions of the qualified rows (just name and address) of first row 2 and then row 5, or the reverse order. Since the columnar operations here are from top portion of the stored table down, the movable arm and head are in the lower portion of the stored table at the conclusion of the columnar operations. The closest row encountered by the arm and head moving upward is row 5. Thus, the optimum row selected portion output sequence should be 5 and then 2, not the reverse.

Figure 13:
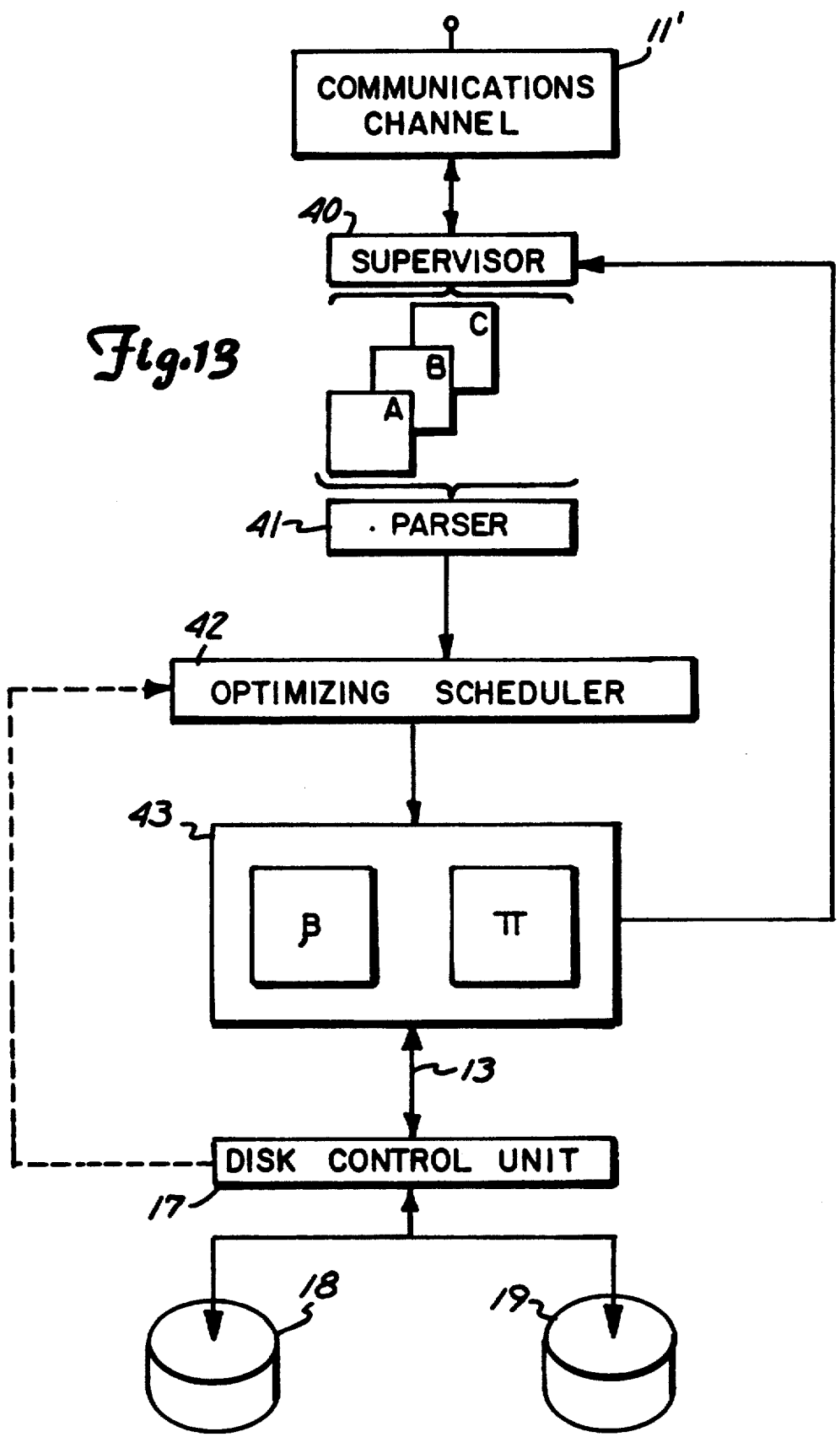
FIG. 13 shows a representation of an assemblage of processes in the system of FIG. 1.

An assemblage of operating processes, which could be performed under a computer instruction program on a single processor, or under one or more computer instruction programs on multiple processors, is shown in FIG. 13 for through data base processor 12 in the system database component of FIG. 1, various array operations P but in an optimal manner to yield the corresponding array operations P' as optimally ordered. A communication channel, 11', including communications adapter 11 from FIG. 1, provides communications with central processor 10. This is the communications means through which storage and retrieval commands and information to be stored are provided, and through which retrieved information is returned. A typical communications channel meets the standard known as SDLC/SNA representing Synchronized Data Link Control—System Network Architecture. Communications into the storage means or system database component first come under the control of a supervisor process, 40, in this storage means which keeps track of the various commands, or requests, provides management functions for this storage means, sorts multiple user inputs including locking, contention, transactions, etc. Commands, or requests, A, B and C are shown to have come under the control of supervisor process 40 and are indicated as being passed on to a parser process, 41.

Parser process 41 accepts commands, or requests, from supervisor process 40 and breaks each one apart into its component basic row and columnar operations in the same manner described above in the example. These basic operations are provided to an optimizing scheduler process, 42, which schedules the performing of these basic row and columnar operations in such a manner as to achieve a minimum delay subject to various design constraints on the ordering, i.e. an optimal schedule. Scheduler process 42 then arranges to have row and column processes, 43, perform the basic row and columnar operations in the order specified to achieve the optimum. The output in the column process is the access path vector of the nature described by the example above. The outputs of the row process are selected segments of qualified rows as specified by the access path vector.

To do these basic row and column operations, these row and column processes 43 directives sent on to disk control unit 17 which accepts these directives to translate them into representations suitable for controlling magnetic disks 18 and 19, there to direct activities at particular storage site sectors at addresses specified by a track, sector and head addressing arrangement. Further, retrieved information items are indicated to be available back to supervisor process 40 to be placed via bus 13, and then through channel 11', to be sent on to the user. Note that the position of the moveable arm and head on disks 18 and 19 may be directly or indirectly provided to optimizing scheduler process 42.

In operation, the storage means, or system database component, of FIG. 1 with the processes of FIG. 13 proceeds in connection with the generalized flow diagram of FIG. 14. FIG. 14 shows four independent processors interconnected, these being (i) a communications processor, 50, which is part of the channel 11' in FIG. 13, (ii) a state processor, 51, which includes the supervisor process 40 and the parser process 41 of FIG. 13, (iii) a row and column processor, 52, which includes the optimizing scheduler process 42 and the row and column processes 43 of FIG. 13, and (iv) an input/output processor, 53, which includes disk control unit 17 of FIG. 13.

Although these are shown as separate processors in the generalized flow chart of FIG. 14, and they may be implemented as four separate processing devices or circuit systems, they may also be provided as computer instruction directed processes implemented on a single processor or circuit system. Further, these processors may be divided between being in part implemented by some single processors, or circuit systems, and being implemented in part as some computer instruction directed process in a processor in any split which is convenient. In addition, a shared memory buffer, 54, is provided to which each of these processors 50 through 53 has access as indicated by the designation (54) at the arrow coming out of the processors through which such access is provided.

As indicated before, commands or requests and information items or data items are passed both ways through the channel 11' including through communications processor 50. Data is placed in shared memory buffer 54. Input commands and requests are passed along a communication means, 55, to an input queue arrangement, 56, associated with state processor 51. State processor 51 monitors queue arrangement 56, and accepts and processes input commands or requests in sequence including parsing complex array operations into basic column and row operations. These basic column and row operation tasks are sent over another communications link, 57, to a row and column operation tasks accumulator, 58.

Task accumulator 58 is not a queue, but rather it is an accumulator of operations tasks that comprise the various array operations to be undertaken. Row and column processor 52 chooses which operations tasks are to be done next, in effect ordering these operations tasks, on the basis of doing the next closest in time task which can be performed. After performing a useful quantity of such operations tasks, such as doing all of the row or columnar basic operation tasks for a particular array operation, row and column processor 52 indicates this to state processor 51 through a further communications link, 59, which places this indication in state processor queue 56. Each time the next optimum basic operations task has been chosen by row and column processor 52, that basic operations task is passed on to input/output processor 53 along a further communication means, 60 to input/output processor 53. Input/output processor 53 performs these basic operation tasks directly on storage sectors contained in the alterable state material in one of the magnetic disks 18 or 19, or another disk if appropriate should more magnetic disks be used.

While the communications described proceed over the communications links, much of the input command and the associated information items or data items need not be passed back and forth among the processors. Rather, these are stored in shared memory buffer 54 and the indications along the communication links merely provide pointers from one processor to another to indicate where the relevant command portions or information items are stored in shared memory buffer 54.

State processor 51 provides the operations management for the storage means or system database component by keeping track of the array operations as each progresses from initialization, to initiation of columnar basic operations, and then to the row basic operations. In addition, there may be, in an information item retrieval situation, certain post processing activities after such retrieval such as sorting the retrieved data items in a requested order, or the like, followed by providing such ordered information items on the channel. An output data information is indicated by a further communications link, 61, by state processor 51 to a queue, 62, associated with communications processor 50. This is the basis for state processor 51 indicating to communications processor 50 where the data ready for output can be found in shared memory buffer 54 to be placed on channel 11'.

Figure 15:
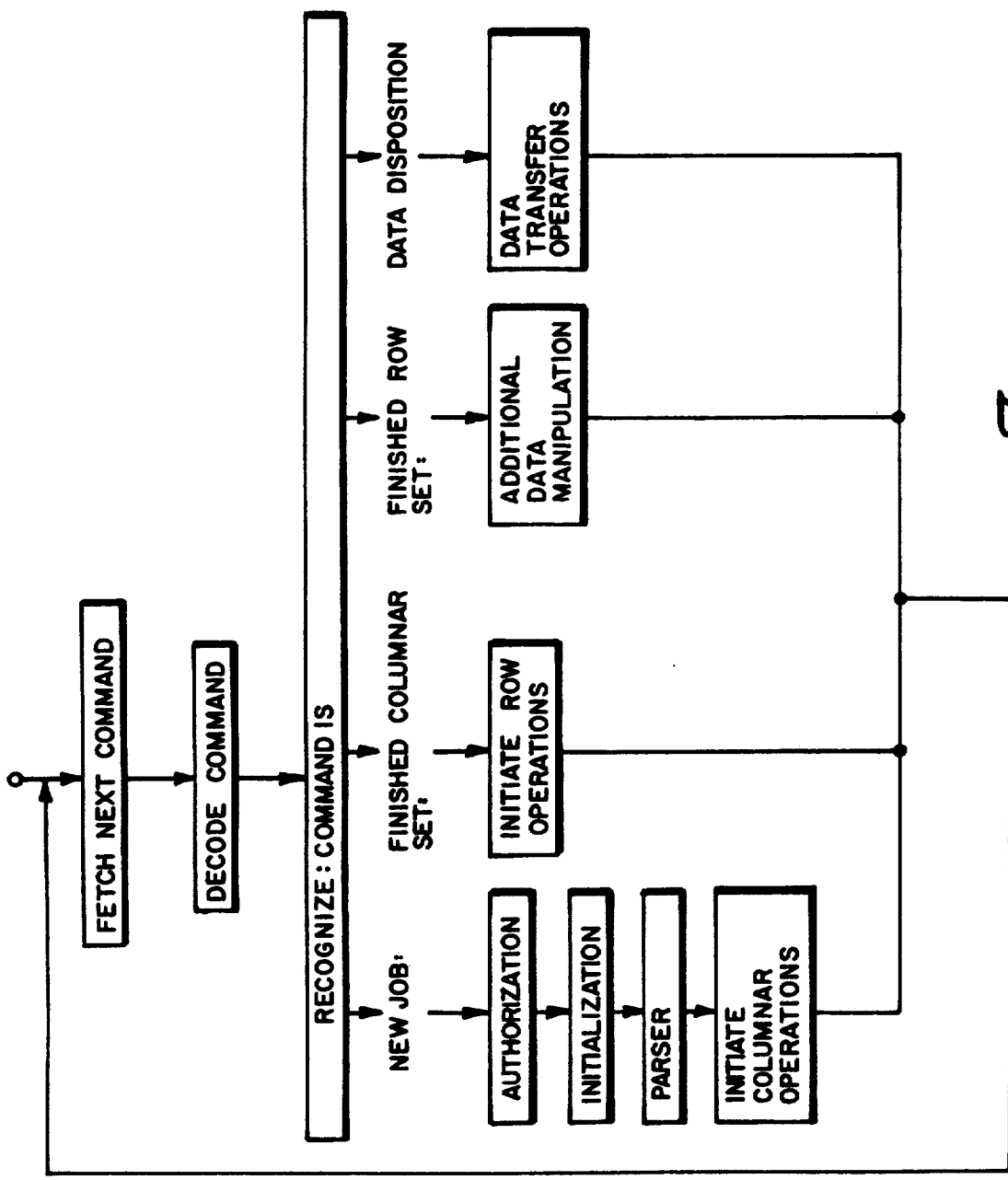
FIG. 15 shows a generalized flow diagram in connection with a processor in FIG. 14.

A generalized flow diagram is shown in FIG. 15 for state processor 51. As indicated, state processor 51 receives information from communications processor 50 and from row and column processor 52. Communications processor 50 supplies new complex array operation commands, or requests, or alternatively commands, or requests, for information items already found from complex array operations previously completed. State processor 51 receives from row and column processor 52 indications of completions of sets of basic columnar operations for a particular complex array operation, or completions of basic row operations for such an array operation. For each of these four types of commands, or requests, state processor 51 will react through performing internal operations where, for instance, a complex array operation in the nature of an information item retrieval request will generally involve each of these command types usually beginning at the left and proceeding to the right in FIG. 15.

If the command received by state processor 51 is to undertake a new complex array operation, then processor 51 will go through a procedure insuring that the source of the command is authorized to affect the storage means in the way commanded and, if so, will then create state tables for keeping track of management information for that array operation and provide other sorts of initialization activities. State processor 51 will also invoke use of its parser process to allocate the complex array operation into its basic columnar and row operations, and then will initiate the columnar operations by indicating such to task accumulator 58.

State processor 51, as indicated, thereafter receives indications from row and column processor 52, in effect a command to proceed, that the columnar basic operations for a particular complex array operation are complete. State processor 51 will then use the completed access path vector, which has been developed in shared memory buffer 54 as a result of the columnar operations being performed, to indicate which rows have been found qualified as a basis for initiating performance of a corresponding set of basic row operations in row and column processor 52.

State processor 51 also receives an indication, again, in effect a command, from row and column processor 52 that the corresponding set of row operations has been completed. This indicates to state processor 51 that the information items retrieved are available at some location in shared buffer memory 54. In addition, the original complex array operation initiation command may direct the performance of additional data manipulation, for example, a sorting of some of the retrieved row information items. If so, state processor 51 performs such additional operations, again leaving the result in shared memory buffer 54.

Finally, the last aspect of a retrieval command, or request, is for state processor 51 to direct the transfer of the retrieval results, or possibly the further manipulation results, located in shared memory buffer 54 to be available to communications processor 50 for transmittal along channel 11' to the appropriate destination. Such action completes a retrieval nature array operation.

In a storage nature array operation, communications processor 50, as the result of an appropriate command or request, indicates to state processor 51 where the incoming information items have been stored in shared memory buffer 54. State processor 51, in receipt of the accompanying command or request, invokes its parser process to allocate the complex array storage request operation into its basic columnar and row operations which again would be indicated to task accumulator 58. This indication would be passed on to row and column processor 52 to indicate where in shared memory buffer 54 the incoming information items are located. Processor 52 indicates this location to input/output processor 53 with directions to appropriately store the items in accord with the basic operations, after which processor 53 acts to place such information items in storage site sectors in the alterable state material of the designated magnetic disk.

Figure 16:
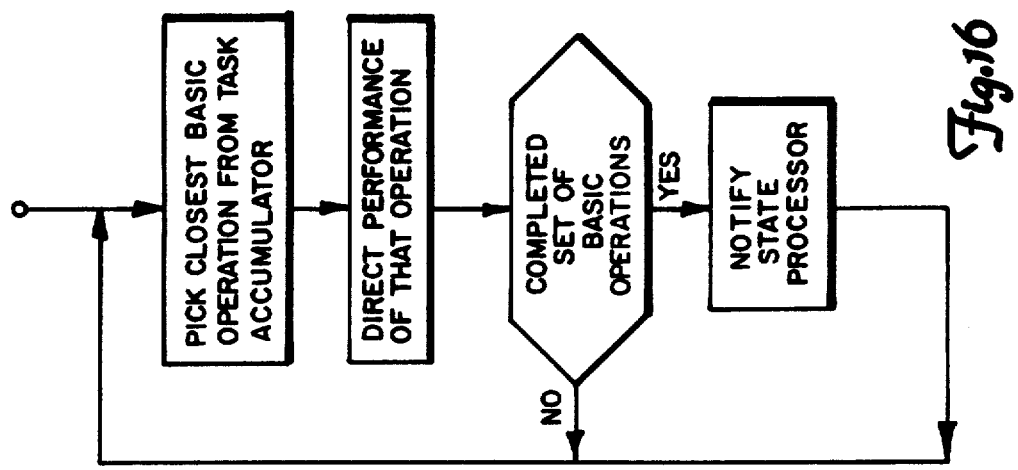
FIG. 16 shows a generalized flow diagram in connection with a processor in FIG. 14.

The operations undertaken by row and column processor 52 are primarily of two kinds, the optimization effort to order the basic columnar and row operations so as to minimize the time required for the totality of such operations needed for a complex array operation, and to direct the performance of those basic operations. This arrangement is indicated in FIG. 16 showing a basic flow diagram for row and column processor 52. The optimization plan to minimize total time is given effect through a process of picking that basic operation which can be started next with a minimum amount of time delay, e.g. picking the basic operation which requires the least movable arm and head travel over the surface of the magnetic disk involved. The resulting ordered operations are directed to be performed by row and column processor 52 by sending an appropriate indication to input/output processor 53 to do so. This picking of basic operations by row and column processor 52, and the directing of input/output processor 53 to have them performed, continues until the last of a set of them associated with a complex array operation has been completed. Such completions are indicated by row and column processor 52 to state processor 51 as has been described above.

Communications processor 50 operates in a well known manner in connection with meeting the SDLC/SNA standard, and in interacting with the other processors of FIG. 14 and shared memory buffer 54. Similarly, input/output processor 53 operates in a well known manner appropriate to successfully operate magnetic disks, or other kinds of alterable state storage media, doing so in accord with various standards. Thus, there is no need to further describe operations of these two processors.

Although the present invention has been described with reference to preferred embodiments, workers skilled in the art will recognize that changes may be made in form and detail without departing from the spirit and scope of the invention.

What is claimed is:

1. A method for storing discrete information representations at, and retrieving such discrete information representations from, any of a plurality of storage locations in an alterable state material provided in a storage means with said plurality of storage locations including first and second sequential pluralities of said storage locations therein each of which has its said storage locations arranged in a sequential order, said storage means being capable of permitting access successively to said storage locations in each of said first and second sequential pluralities thereof only in its said sequential order for purposes of such storing and retrieving and, after permitting access to a selected said storage location in one of said first and second sequential pluralities thereof for such a purpose, being capable of permitting that next following access for such a purpose to a corresponding said storage location in that other said sequential plurality remaining which is first available for such a following access, said method comprising:

receiving at a first input in said storage means a first sequence of said discrete information representations;

storing said first sequence of discrete information representations in said first sequential plurality of storage locations in said alterable state material;

receiving at a second input in said storage means a second sequence of said discrete information representations where each said discrete information representation in said first sequence thereof, if retrieved by said storage means and provided at a first output thereof, is to have either of a selected one of (i) its following said discrete information representation in said first sequence, if any, and (ii)

a corresponding said discrete information representation in said second sequence, directly retrievable thereafter and provided at a second output of said storage means; and storing each of said discrete information representations in said second sequence thereof in a said storage location selected from that portion of those said storage locations in said second sequential plurality thereof included in its sequential order onward from that said storage location therein corresponding, as aforesaid, to that said storage location in said first sequential plurality thereof in which is stored that discrete information representation in said first sequence thereof to which that said second sequence discrete information representation being stored corresponds.

2. The method of claim 1 wherein said storage means is a bubble memory storage device and said first and second sequential pluralities of storage locations are formed by sector loops in a magnetic medium in which bubble domains can be propagated and to which access for storing and retrieving is made through a track loop also in said magnetic medium.

3. The method of claim 1 wherein said storage means comprises an optical disk drive means with said first and second sequential pluralities of storage locations each being formed along paths in an alterable optical state material formed on a rotatable substrate to which access is provided by a corresponding movable arm having electromagnetic radiation generating and sensing means thereof which can be positioned over such paths.

4. The method of claim 1 wherein said storage means comprises a magnetic disk drive means with said first and second sequential pluralities of storage locations each being formed along paths in an orientable magnetization magnetic material formed on a rotatable substrate to which access is provided by a corresponding movable arm having magnetic field generating and sensing means thereon which can be positioned over such paths.

5. The method of claim 1 wherein said discrete information representations are arrangeable as cells in a first rectangular array in rows and columns with said first and second sequences of discrete information representations each being at least a portion of a row in said first rectangular array such that a said discrete information representation in said first sequence thereof corresponds, as aforesaid, to a said discrete information representation in said second sequence thereof through sharing a common said column therewith in said first rectangular array.

6. The method of claim 1 wherein there is a third sequential plurality of said storage locations which has its storage locations arranged in a sequential order and said storage means is capable of permitting access successively to said storage locations in said third sequential plurality thereof only in its said sequential order for purposes of such storing and retrieving and, after permitting access to a selected said storage location in said second sequential plurality thereof for such a purpose, being capable of permitting that next following access for such a purpose to a corresponding said storage location in said third sequential plurality thereof which is first available for such a following access; and wherein said method further comprises:

receiving in said storage means a third sequence of said discrete information representations where each said discrete information representation in said second sequence thereof, if retrieved by said storage means and provided at an output thereof, is to have either of a selected one of (i) its following said discrete information representation in said second sequence, if any, and (ii) a corresponding said discrete information representation in said third sequence, directly retrievable thereafter from said storage means; and storing each of said discrete information representations in said third sequence thereof in a said storage location selected from that portion of those said storage locations in said third sequential plurality thereof included in its sequential order onward from that said storage location therein corresponding, as aforesaid, to that said storage location in said second sequential plurality thereof in which is stored that discrete information representation in said second sequence thereof to which that said third sequence discrete information representation being stored corresponds.

7. The method of claim 1 wherein said storage means first input and second input are a common input.

8. The method of claim 1 wherein said storage means first output and second output are a common output.

9. The method of claim 4 wherein said storage means comprises a single magnetic disk drive having first and second rotatable substrates therein each having an orientable magnetization magnetic material formed thereon, said first rotatable substrate having said first sequential plurality of storage locations formed along paths in that said orientable magnetization magnetic material formed thereon, and said second rotatable substrate having said second sequential plurality of storage locations formed along paths in that said orientable magnetization magnetic material formed thereon.

10. The method of claim 4 wherein said storage means comprises a plurality of magnetic disk drives each having a rotatable substrate with an orientable magnetization magnetic material formed thereon, including first and second rotatable substrates in first and second magnetic disk drives, respectively, said first rotatable substrate having said first sequential plurality of storage locations formed along paths in that said orientable magnetization magnetic material formed thereon, and said second rotatable substrate having said second sequential plurality of locations formed along paths in that said orientable magnetization magnetic material formed thereon.

11. The method of claim 5 wherein said discrete information representations are arrangeable as cells in a rectangular solid comprising a plurality of said rectangular arrays including said first rectangular array, with said discrete information items in each of said first and second sequences thereof being a portion of an orthogonal row which is orthogonal to both said rows and said columns and which extends through each of said rectangular arrays in said plurality thereof.

12. The method of claim 6 wherein there is an ordered multiplicity of sequential pluralities of said storage locations in a plurality order, including said first, second and third sequential pluralities of storage locations, each of which said sequential pluralities has its said storage locations arranged in a storage location sequential order, with said storage means being capable of permitting access successively to said storage locations in each of said sequential pluralities thereof only in said storage location sequential order for purposes of said storing and retrieving and, after permitting access to a selected said storage location in one of said sequential pluralities thereof in said multiplicity for such a purpose, being capable of permitting that next following access for such a purpose to a corresponding said storage location in that sequential plurality next in order which is first available for such a following access; and wherein said method further comprises receiving a plurality of sequences of said discrete information representations in a sequence order, including said first, second and third sequences of discrete information representations, and storing each of them in one of said sequential pluralities of storage locations in said multiplicity with said sequence order corresponding to said plurality order and with each discrete information representation in a sequence thereof having a corresponding said discrete information representation in that sequential plurality thereof next in said sequence order, said corresponding discrete information representation in a sequence next in sequential order being stored in that said storage location which corresponds, as aforesaid, to that storage location in which that said discrete information representation in that sequence preceding is stored to which that one being stored corresponds.

13. The method of claim 12 wherein said storage means is a bubble memory storage device and said first and second sequential pluralities of storage locations are formed by sector loops in a magnetic medium in which bubble domains can be propagated and to which access for storing and retrieving is made through a track loop also in said magnetic medium.

14. The method of claim 12 wherein said storage means comprises an optical disk drive means with said first and second sequential pluralities of storage locations each being formed along paths in an alterable optical state material formed on a rotatable substrate to which access is provided by a corresponding movable arm having electromagnetic radiation generating and sensing means thereof which can be positioned over such paths.

15. The method of claim 12 wherein said storage means comprises a magnetic disk drive means with said first and second sequential pluralities of storage locations each being formed along paths in an orientable magnetization magnetic material formed on a rotatable substrate to which access is provided by a corresponding movable arm having magnetic field generating and sensing means thereon which can be positioned over such paths.

16. The method of claim 12 wherein said storage means is capable of retrieving at least portions of selected ones of said plurality of sequences of said discrete information representations and, upon completing that retrieval, being capable of retrieving at least portions of a correspondence sequence of said corresponding discrete information representations with there being one from each of selected ones of said plurality of sequences of said discrete information representations in said sequence order, said retrieval of said correspondence sequence occurring by said storage means retrieving by direct access to those corresponding said storage sites in which said correspondence sequence discrete information items are located.

17. The method of claim 12 wherein said storage means is capable of retrieving at least portions of a correspondence sequence of said corresponding discrete information representations with there being one from each of selected ones of said plurality of sequences of said discrete information representations in said sequence order, said retrieval of said correspondence sequence occurring by said storage means retrieving by direct access to those corresponding said storage sites in which said correspondence sequence discrete information items are located, and, upon completing that retrieval, being capable of retrieving at least portions of selected ones of said plurality of sequences of said discrete information representations.

18. The method of claim 12 wherein said discrete information representations are arrangeable as cells in a first rectangular array in rows and columns with said first and second sequences of discrete information representations each being at least a portion of a row in said first rectangular array such that a said discrete information representation in said first sequence thereof corresponds, as aforesaid, to a said discrete information representation in said second sequence thereof through sharing a common said column therewith in said first rectangular array.

19. The method of claim 15 wherein said storage means comprises a single magnetic disk drive having first and second rotatable substrates therein each supporting an orientable magnetization magnetic material, said first rotatable substrate having said first sequential plurality of storage locations formed along paths in that orientable magnetization magnetic material formed thereon, and said second rotatable substrate having said second sequential plurality of storage locations formed along paths in that orientable magnetization magnetic material formed thereon.

20. The method of claim 15 wherein said storage means comprises a plurality of magnetic disk drives each having a rotatable substrate with an orientable magnetization magnetic material formed thereon, including first and second rotatable substrates in first and second magnetic disk drives, respectively, said first rotatable substrate having said first sequential plurality of storage locations formed along paths in that said orientable magnetization magnetic material formed thereon, and said second rotatable substrate having said second sequential plurality of locations formed along paths in that said orientable magnetization magnetic material formed thereon.

21. A method for storing discrete information representations at, and retrieving such discrete information representations from, any of a plurality of storage locations in an alterable state material provided in a storage means with said plurality of storage locations including first and second sequential pluralities of said storage locations therein each of which has its said storage locations arranged in a sequential order, said storage means being capable of permitting access successively to said storage locations in each of said first and second sequential pluralities thereof only in its said sequential order for purposes of such storing and retrieving and, after permitting access to a selected said storage location in one of said first and second sequential pluralities thereof for such a purpose, being capable of permitting that next following access for such a purpose to a corresponding said storage location in that other said sequential plurality remaining which is first available for such a following access, said method comprising:

receiving at a first input in said storage means a first oriented sequence of said discrete information representations;

storing said first oriented sequence of discrete information representations in said first sequential plurality of storage locations in said alterable state material;

receiving at a second input in said storage means a second oriented sequence of said discrete information representations where each said discrete information representation in said first oriented sequence thereof is also part of one of a plurality of cross sequences in each of which a corresponding discrete information representation in said second oriented sequence thereof is also a member, and;

storing each of said discrete information representations in said second sequence thereof in a said storage location selected from that portion of those said storage locations in said second sequential plurality thereof included in its sequential order onward from that said storage location therein corresponding, as aforesaid, to that said storage location in said first sequential plurality thereof in which is stored that discrete information representation in said first sequence thereof to which that said second sequence discrete information representation being stored corresponds.

22. The method of claim 21 wherein said storage means is a bubble memory storage device and said first and second sequential pluralities of storage locations are formed by sector loops in a magnetic medium in which bubble domains can be propagated and to which access for storing and retrieving is made through a track loop also in said magnetic medium.

23. The method of claim 21 wherein said storage means comprises an optical disk drive means with said first and second sequential pluralities of storage locations each being formed along paths in an alterable optical state material formed on a rotatable substrate to which access is provided by a moving arm having electromagnetic radiation generating and sensing means thereof which can be positioned over such paths.

24. The method of claim 21 wherein said storage means comprises a magnetic disk drive means with said first and second sequential pluralities of storage locations each being formed along paths in an orientable magnetization magnetic material formed on a rotatable substrate to which access is provided by a moving arm having magnetic field generating and sensing means thereon which can be positioned over such paths.

25. The method of claim 21 wherein said discrete information representations are arrangeable in a first rectangular array in rows and columns with said first and second sequences of discrete information representations each being at least a portion of a row in said first rectangular array such that a said discrete information representation in said first sequence thereof corresponds, as aforesaid, to a said discrete information representation in said second sequence thereof through sharing a common said column therewith in said first rectangular array.

26. The method of claim 21 wherein there is a third sequential plurality of said storage locations which has its storage locations arranged in a sequential order and said storage means is capable of permitting access successively to said storage locations in said third sequential plurality thereof only in its said sequential order for purposes of such storing and retrieving and, after permitting access to a selected said storage location in said second sequential plurality thereof for such a purpose, being capable of permitting that next following access for such a purpose to a corresponding said storage location in said third sequential plurality thereof which is first available for such a following access; and wherein said method further comprises:

receiving in said storage means a third sequence of said discrete information representations where each said discrete information representation in said third sequence thereof is also a corresponding part of one of said cross sequences in said plurality thereof, and;

storing each of said discrete information representations in said third sequence thereof in a said storage location selected from that portion of those said storage locations in said third sequential plurality thereof included in its sequential order onward from that said storage location therein corresponding, as aforesaid, to that said storage location in said second sequential plurality thereof in which is stored that discrete information representation in said second sequence thereof to which that said third sequence discrete information representation being stored corresponds.

27. The method of claim 24 wherein said storage means comprises a single magnetic disk drive having first and second rotatable substrates therein each having an orientable magnetization magnetic material formed thereon, said first rotatable substrate having said first sequential plurality of storage locations formed along paths in that said orientable magnetization magnetic material formed thereon, and said second rotatable substrate having said second sequential plurality of storage locations formed along paths in that said orientable magnetization magnetic material formed thereon.

28. The method of claim 24 wherein said storage means comprises a plurality of magnetic disk drives each having a rotatable substrate with an orientable magnetization magnetic material formed thereon, including first and second rotatable substrates in first and second magnetic disk drives, respectively, said first rotatable substrate having said first sequential plurality of storage locations formed along paths in that said orientable magnetization magnetic material formed thereon, and said second rotatable substrate having said second sequential plurality of locations formed along paths in that said orientable magnetization magnetic material formed thereon.

29. The method of claim 25 wherein said discrete information representations are arrangeable as cells in a rectangular solid comprising a plurality of said rectangular arrays including said first rectangular array, with said discrete information items in each of said first and second sequences thereof being a portion of an orthogonal row which is orthogonal to both said rows and said columns and which extends through each of said rectangular arrays in said plurality thereof.

30. The method of claim 25 wherein there is an ordered multiplicity of sequential pluralities of said storage locations in a plurality order, including said first, second and third sequential pluralities of storage locations, each of which said sequential pluralities has its said storage locations arranged in a storage location sequential order, with said storage means being capable of permitting access successively to said storage locations in each of said sequential pluralities thereof only in said storage location sequential order for purposes of said storing and retrieving and, after permitting access to a selected said storage location in one of said sequential pluralities thereof in said multiplicity for such a purpose, being capable of permitting that next following access for such a purpose to a corresponding said storage location in that sequential plurality next in order which is first available for such a following access; and wherein said method further comprises receiving a plurality of sequences of said discrete information representations in a sequence order, including said first, second and third sequences of discrete information representations, and storing each of them in one of said sequential pluralities of storage locations in said multiplicity with said sequence order corresponding to said plurality order and with each discrete information representation in a sequence thereof having a corresponding said discrete information representation in that sequential plurality thereof next in said sequence order as part of a said cross sequence in said plurality thereof, said corresponding discrete information representation in a sequence next in sequential order being stored in that said storage location which corresponds, as aforesaid, to that storage location in which that said discrete information representation in that sequence preceding is stored to which that one being stored corresponds.

31. The method of claim 30 wherein said storage means is a bubble memory storage device and said first and second sequential pluralities of storage locations are formed by sector loops in a magnetic medium in which bubble domains can be propagated and to which access for storing and retrieving is made through a track loop also in said magnetic medium.

32. The method of claim 30 wherein said storage means comprises an optical disk drive means with said first and second sequential pluralities of storage locations each being formed along paths in an alterable optical state material formed on a rotatable substrate to which access is provided by a moving arm having electromagnetic radiation generating and sensing means thereof which can be positioned over such paths.

33. The method of claim 30 wherein said storage means is a bubble memory storage device and said first and second sequential pluralities of storage locations are formed by sector loops in a magnetic medium in which bubble domains can be propagated and to which access for storing and retrieving is made through a track loop also in said magnetic medium.

34. The method of claim 30 wherein said storage means is capable of retrieving at least portions of selected ones of said plurality of sequences of said discrete information representations and, upon completing that retrieval, being capable of retrieving at least portions of a correspondence sequence of said corresponding discrete information representations with there being one from each of selected ones of said plurality of sequences of said discrete information representations in said sequence order, said retrieval of said correspondence sequence occurring by said storage means retrieving by direct access to those corresponding said storage sites in which said correspondence sequence discrete information items are located.

35. The method of claim 30 wherein said storage means is capable of retrieving at least portions of a correspondence sequence of said corresponding discrete information representations with there being one from each of selected ones of said plurality of sequences of said discrete information representations in said sequence order, said retrieval of said correspondence sequence occurring by said storage means retrieving by direct access to those corresponding said storage sites in which said correspondence sequence discrete information items are located, and, upon completing that retrieval, being capable of retrieving at least portions of selected ones of said plurality of sequences of said discrete information representations.

36. The method of claim 30 wherein said discrete information representations are arrangeable as cells in a first rectangular array in rows and columns with said first and second sequences of discrete information representations each being at least a portion of a row in said first rectangular array such that a said discrete information representation in said first sequence thereof corresponds, as aforesaid, to a said discrete information representation in said second sequence thereof through sharing a common said column therewith in said first rectangular array.

37. The method of claim 35 wherein said storage means comprises a single magnetic disk drive having first and second rotatable substrates therein each supporting an orientable magnetization magnetic material, said first rotatable substrate having said first sequential plurality of storage locations formed along paths in that orientable magnetization magnetic material formed thereon, and said second rotatable substrate having said second sequential plurality of storage locations formed along paths in that orientable magnetization magnetic material formed thereon.

38. The method of claim 33 wherein said storage means comprises a plurality of magnetic disk drives each having a rotatable substrate with an orientable magnetization magnetic material formed thereon, including first and second rotatable substrates in first and second magnetic disk drives, respectively, said first rotatable substrate having said first sequential plurality of storage locations formed along paths in that said orientable magnetization magnetic material formed thereon, and said second rotatable substrate having said second sequential plurality of locations formed along paths in that said orientable magnetization magnetic material formed thereon.

39. A method for retrieving discrete information representations from any of a plurality of storage locations in an alterable state material provided in a storage means with said plurality of storage locations including first and second sequential pluralities of said storage locations therein each of which has its said storage locations arranged in a sequential order, said storage means being capable of permitting access successively to said storage locations in each of said first and second sequential pluralities thereof only in its said sequential order for purposes of such retrieving and, after permitting access to a selected said storage location in one of said first and second sequential pluralities thereof for such a purpose, being capable of permitting that next following access for such a purpose to a corresponding said storage location in that other said sequential plurality remaining which is first available for such a following access, said first sequential plurality of storage locations in said alterable state material having a first sequence of discrete information representations stored therein, said second sequential plurality of storage locations having a second sequence of discrete information representations stored therein where each said discrete information representation in said first sequence thereof has a corresponding discrete information representation in said second sequence thereof, and with each of said discrete information representations in said second sequence thereof being stored in a said storage location selected from that portion of those storage locations in said second sequential plurality thereof included in its sequential order onward from that said storage location therein corresponding, as aforesaid, to that said storage location in said first sequential plurality thereof in which is stored that discrete information representation in said first sequence thereof to which that said second sequence discrete information representation concerned corresponds, said method comprising:

retrieving a first discrete information representation from said first sequence thereof;

retrieving directly a second discrete information representation in said second sequence thereof corresponding to said first discrete information representation, as aforesaid; and providing said first and second discrete information representations at least at one output of said storage means.

40. The method of claim 39 wherein said storage means is a bubble memory storage device and said first and second sequential pluralities of storage locations are formed by sector loops in a magnetic medium in which bubble domains can be propagated and to which access for storing and retrieving is made through a track loop also in said magnetic medium.

41. The method of claim 39 wherein said storage means comprises an optical disk drive means with said first and second sequential pluralities of storage locations each being formed along paths in an alterable optical state material formed on a rotatable substrate to which access is provided by a corresponding movable arm having electromagnetic radiation generating and sensing means thereof which can be positioned over such paths.

42. The method of claim 39 wherein said storage means comprises a magnetic disk drive means with said first and second sequential pluralities of storage locations each being formed along paths in an orientable magnetization magnetic material formed on a rotatable substrate to which access is provided by a corresponding movable arm having magnetic field generating and sensing means thereon which can be positioned over such paths.

43. The method of claim 39 wherein said discrete information representations are arrangeable as cells in a first rectangular array in rows and columns with said first and second sequences of discrete information representations each being at least a portion of a row in said first rectangular array such that a said discrete information representation in said first sequence thereof corresponds, as aforesaid, to a said discrete information representation in said second sequence thereof through sharing a common said column therewith in said first rectangular array.

44. The method of claim 39 wherein there is a third sequential plurality of said storage locations which has its storage locations arranged in a sequential order and said storage means is capable of permitting access successively to said storage locations in said third sequential plurality thereof only in its said sequential order for purposes of such retrieving and, after permitting access to a selected said storage location in said second sequential plurality thereof for such a purpose, being capable of permitting that next following access for such a purpose to a corresponding said storage location in said third sequential plurality thereof which is first available for such a following access, said third sequential plurality of storage locations having a third sequence of said discrete information representations stored therein where each said discrete information representation in said second sequence thereof has a corresponding discrete information representation in said third sequence thereof, and with each of said discrete information representations in said third sequence thereof being stored in a said storage location selected from that portion of those said storage locations in said third sequential plurality thereof included in its sequential order onward from that said storage location therein corresponding, as aforesaid, to that said storage location in said second sequential plurality thereof in which is stored that discrete information representation in said second sequence thereof to which that said third sequence discrete information representation concerned corresponds.

45. The method of claim 42 wherein said storage means comprises a single magnetic disk drive having first and second rotatable substrates therein each having an orientable magnetization magnetic material formed thereon, said first rotatable substrate having said first sequential plurality of storage locations formed along paths in that said orientable magnetization magnetic material formed thereon, and said second rotatable substrate having said second sequential plurality of storage locations formed along paths in that said orientable magnetization magnetic material formed thereon.

46. The method of claim 42 wherein said storage means comprises a plurality of magnetic disk drives each having a rotatable substrate with an orientable magnetization magnetic material formed thereon, including first and second rotatable substrates in first and second magnetic disk drives, respectively, said first rotatable substrate having said first sequential plurality of storage locations formed along paths in that said orientable magnetization magnetic material formed thereon, and said second rotatable substrate having said second sequential plurality of locations formed along paths in that said orientable magnetization magnetic material formed thereon.

47. The method of claim 43 wherein said discrete information representations are arrangeable as cells in a rectangular solid comprising a plurality of said rectangular arrays including said first rectangular array, with said discrete information items in each of said first and second sequences thereof being a portion of an orthogonal row which is orthogonal to both said rows and said columns and which extends through each of said rectangular arrays in said plurality thereof.

48. The method of claim 44 wherein there is an ordered multiplicity of sequential pluralities of said storage locations in a plurality order, including said first, second and third sequential pluralities of storage locations, each of which said sequential pluralities has its said storage locations arranged in a storage location sequential order, with said storage means being capable of permitting access successively to said storage locations in each of said sequential pluralities thereof only in said storage location sequential order for purposes of said storing and retrieving and, after permitting access to a selected said storage location in one of said sequential pluralities thereof in said multiplicity for such a purpose, being capable of permitting that next following access for such a purpose to a corresponding said storage location in that sequential plurality next in order which is first available for such a following access; and wherein a plurality of sequences of said discrete information representations in a sequence order, including said first, second and third sequences of discrete information representations, are each stored each of them in one of said sequential pluralities of storage locations in said multiplicity with said sequence order corresponding to said plurality order and with each discrete information representation in a sequence thereof having a corresponding said discrete information representation in that sequential plurality thereof next in said sequence order, said corresponding discrete information representation in a sequence next in sequential order being stored in that said storage location which corresponds, as aforesaid, to that storage location in which that said discrete information representation in that sequence preceding is stored to which that one being stored corresponds.

49. The method of claim 48 wherein said storage means is a bubble memory storage device and said first and second sequential pluralities of storage locations are formed by sector loops in a magnetic medium in which bubble domains can be propagated and to which access for retrieving is made through a track loop also in said magnetic medium.

50. The method of claim 48 wherein said storage means comprises an optical disk drive means with said first and second sequential pluralities of storage locations each being formed along paths in an alterable optical state material formed on a rotatable substrate to which access is provided by a corresponding movable arm having electromagnetic radiation sensing means thereof which can be positioned over such paths.

51. The method of claim 48 wherein said storage means comprises a magnetic disk drive means with said first and second sequential pluralities of storage locations each being formed along paths in an orientable magnetization magnetic material formed on a rotatable substrate to which access is provided by a corresponding movable arm having magnetic field sensing means thereon which can be positioned over such paths.

52. The method of claim 48 wherein said storage means is capable of retrieving at least portions of selected ones of said plurality of sequences of said discrete information representations and, upon completing that retrieval, being capable of retrieving at least portions of a correspondence sequence of said corresponding discrete information representations with there being one from each of selected ones of said plurality of sequences of said discrete information representations in said sequence order, said retrieval of said correspondence sequence occurring by said storage means retrieving by direct access to those corresponding said storage sites in which said correspondence sequence discrete information items are located.

53. The method of claim 48 wherein said storage means is capable of retrieving at least portions of a correspondence sequence of said corresponding discrete information representations with there being one from each of selected ones of said plurality of sequences of said discrete information representations in said sequence order, said retrieval of said correspondence sequence occurring by said storage means retrieving by direct access to those corresponding said storage sites in which said correspondence sequence discrete information items are located, and, upon completing that retrieval, being capable of retrieving at least portions of selected ones of said plurality of sequences of said discrete information representations.

54. The method of claim 48 wherein said discrete information representations are arrangeable as cells in a first rectangular array in rows and columns with said first and second sequences of discrete information representations each being at least a portion of a row in said first rectangular array such that a said discrete information representation in said first sequence thereof corresponds, as aforesaid, to a said discrete information representation in said second sequence thereof through sharing a common said column therewith in said first rectangular array.

55. The method of claim 51 wherein said storage means comprises a single magnetic disk drive having first and second rotatable substrates therein each supporting an orientable magnetization magnetic material, said first rotatable substrate having said first sequential plurality of storage locations formed along paths in that orientable magnetization magnetic material formed thereon, and said second rotatable substrate having said second sequential plurality of storage locations formed along paths in that orientable magnetization magnetic material formed thereon.

56. The method of claim 51 wherein said storage means comprises a plurality of magnetic disk drives each having a rotatable substrate with an orientable magnetization magnetic material formed thereon, including first and second rotatable substrates in first and second magnetic disk drives, respectively, said first rotatable substrate having said first sequential plurality of storage locations formed along paths in that said orientable magnetization magnetic material formed thereon, and said second rotatable substrate having said second sequential plurality of locations formed along paths in that said orientable magnetization magnetic material formed thereon.

57. A storage means for storing discrete information representations at, and retrieving such discrete information representations from, any of a plurality of storage locations in an alterable state material provided in said storage means, said storage means comprising:

an alterable state material provided on a substrate having an ordered multiplicity of sequential pluralities of said storage locations in a plurality order each of which said sequential pluralities has its said storage locations arranged in a storage location sequential order;

an access means capable of access successively to said storage locations in each of said sequential pluralities thereof in said multiplicity thereof only in said storage location sequential order for purposes of said storing and retrieving and, after having access to a selected said storage location in one of said sequential pluralities thereof in said multiplicity thereof for such a purpose, being capable of permitting that next following access for such a purpose to a corresponding said storage location in that sequential plurality next in order which is first available for such a following access;

receiving means for receiving pluralities of sequences of said discrete information representations and maintaining them in a sequence order such that each said discrete information representation in a sequence thereof has a corresponding said discrete information representation in that sequential plurality thereof next in said sequence order maintained; and a control means capable of directing said access means to store said plurality of sequences of said discrete information representations in said multiplicity of sequential pluralities of said storage locations with said sequential order corresponding to said plurality order such that a corresponding discrete information representation in a sequence next in sequential order is stored in that said storage location which corresponds, as aforesaid, to that storage location in which that said discrete information representation in that sequence preceding is stored to which that one being stored corresponds.

58. A storage means for retrieving discrete information representations from any of a plurality of storage locations in an alterable state material provided in said storage means, said storage means comprising:

an alterable state material provided on a substrate having an ordered multiplicity of sequential pluralities of said storage locations in a plurality order each of which said sequential pluralities has its said storage locations arranged in a storage location sequential order, there being pluralities of sequences of said discrete information representations in a sequence order stored in said multiplicity of sequential pluralities of storage locations with said sequence order corresponding to said plurality order, each said discrete information representation in a sequence thereof having a corresponding said discrete information representation in that sequential plurality thereof next in said sequence order;

an access means capable of access successively to said storage locations in each of said sequential pluralities thereof in said multiplicity thereof only in said storage location sequential order for purposes of said storing and retrieving and, after having access to a selected said storage location in one of said sequential pluralities thereof in said multiplicity thereof for such a purpose, being capable of permitting that next following access for such a purpose to a corresponding said storage location in that sequential plurality next in order which is first available for such a following access; and a control means capable of directing said access means to retrieve said plurality of sequences of said discrete information representations such that a corresponding discrete information representation in a sequence next in sequential order is retrieved from that said storage location which corresponds, as aforesaid, to that storage location in which that said discrete information representation in that sequence preceding is stored to which that one being retrieved corresponds.

59. A method for storing discrete information representations at, and retrieving such discrete information representations from, any of a plurality of storage locations in an alterable state material provided in a storage means with said plurality of storage locations including first and second sequential pluralities thereof each of which has its said storage locations arranged in a sequential order, said storage means being capable of permitting access successively to said storage location in each of said first and second sequential pluralities thereof only in its said sequential order for purposes of such storing and retrieving and, after permitting access to a selected said storage location in one of said first and second sequential pluralities thereof for such purpose, being capable of permitting that access next following for such a purpose to be to a corresponding said storage location in that other said sequential plurality remaining that is that one first available for such a following access, said method comprising:

receiving at a first input in said storage means a first sequence of said discrete information representations;

storing sequentially said first sequence of discrete information representations in said first sequential plurality of storage locations in said alterable state material beginning at a selected storage location;

receiving at a second input in said storage means a second sequence of said discrete information representations where each said discrete information representation in said first sequence thereof, if retrieved by said storage means and provided at a first output thereof, is to have either of a selected one of (i) its following said discrete information representation in said first sequence, if any, and (ii) a corresponding said discrete information representation in said second sequence, directly retrievable thereafter and provided at a second output of said storage means; and storing sequentially each of said discrete information representations in said second sequence thereof in said second sequential plurality of storage locations beginning with that one first available from said selected location in said first sequential plurality of storage locations, as aforesaid, and onward therefrom.

60. The method of claim 59 wherein said storage means is a bubble memory storage device and said first and second sequential pluralities of storage locations are formed by sector loops in a magnetic medium in which bubble domains can be propagated and to which access for storing and retrieving is made through a track loop also in said magnetic medium.

61. The method of claim 59 wherein said storage means comprises an optical disk drive means with said first and second sequential pluralities of storage locations each being formed along paths in an alterable optical state material formed on a rotatable substrate to which access is provided by a corresponding movable arm having electromagnetic radiation generating and sensing means thereof which can be positioned over such paths.

62. The method of claim 59 wherein said storage means comprises a magnetic disk drive means with said first and second sequential pluralities of storage locations each being formed along paths in an orientable magnetization magnetic material formed on a rotatable substrate to which access provided by a corresponding movable arm having magnetic field generating and sensing means thereon which can be positioned over such paths.

63. The method of claim 59 wherein said discrete information representations are arrangeable as cells in a first rectangular array in rows and columns with said first and second sequences of discrete information representations each being at least portions of rows in said first rectangular array such that a said discrete information representation in said first sequence thereof corresponds, as aforesaid, to a said discrete information representation in said second sequence thereof through sharing a common said column therewith in said first rectangular array.

64. The method of claim 59 wherein there is a third sequential plurality of said storage locations which has its storage locations arranged in a sequential order and said storage means is capable of permitting access successively to said storage locations in said third sequential plurality thereof only in its said sequential order for purposes of such storing and retrieving and, after permitting access to a selected said storage location in said second sequential plurality thereof for such a purpose, being capable of permitting that access next following for such a purpose to be to a corresponding said storage location in said third sequential plurality thereof that is that one first available for such a following access; and wherein said method further comprises:

receiving in said storage means a third sequence of said discrete information representations where each said discrete information representation in said second sequence thereof, if retrieved by said storage means and provided at an output thereof, is to have either of a selected one of (i) its following said discrete information representation in said second sequence, if any, and (ii) a corresponding said discrete information representation in said third sequence, directly retrievable thereafter from said storage means; and storing sequentially each of said discrete information representations in said third sequence thereof in said third sequential plurality of storage locations beginning with that one first available from said storage location in said second sequential plurality thereof in which said second sequence discrete information representations were begun being stored, as aforesaid, and onward therefrom.

65. The method of claim 59 wherein said storage means first input and second input are a common input.

66. The method of claim 59 wherein said storage means first output and second output are a common output.

67. The method of claim 62 wherein said storage means comprises a single magnetic disk drive having first and second rotatable substrates therein each having an orientable magnetization magnetic material formed thereon, said first rotatable substrate having said first sequential plurality of storage locations formed along paths in that said orientable magnetization magnetic material formed thereon, and said second rotatable substrate having said second sequential plurality of storage locations formed along paths in that said orientable magnetization magnetic material formed thereon.

68. The method of claim 62 wherein said storage means comprises a plurality of magnetic disk drives each having a rotatable substrate with an orientable magnetization magnetic material formed thereon, including first and second rotatable substrates in first and second magnetic disk drives, respectively, said first rotatable substrate having said first sequential plurality of storage locations formed along paths in that said orientable magnetization magnetic material formed thereon, and said second rotatable substrate having said second sequential plurality of locations formed along paths in that said orientable magnetization magnetic material formed thereon.

69. The method of claim 63 wherein said discrete information representations are arrangeable as cells in a rectangular solid comprising a plurality of said rectangular arrays including said first rectangular array, with said discrete information items in each of said first and second sequences thereof being a portion of an orthogonal row which is orthogonal to both said rows and said columns and which extends through each of said rectangular arrays in said plurality thereof.

70. The method of claim 64 wherein there is an ordered multiplicity of sequential pluralities of said storage locations in a plurality order, including said first, second and third sequential pluralities of storage locations, each of which said sequential pluralities has its said storage locations arranged in a storage location sequential order, with said storage means being capable of permitting access successively to said storage locations in each of said sequential pluralities thereof only in said storage location sequential order for purposes of said storing and retrieving and, after permitting access to a selected said storage location in one of said sequential pluralities thereof in said multiplicity for such a purpose, being capable of permitting that access next following for such a purpose to be to a corresponding said storage location in that sequential plurality next in order that is that one first available for such a following access; and wherein said method further comprises receiving a plurality of sequences of said discrete information representations in a sequence order, including said first, second and third sequences of discrete information representation in a sequence thereof having a corresponding said discrete information representation in that sequential plurality thereof next in said sequence order, said corresponding discrete information representation in a sequence next in sequential order being stored in that said storage location which corresponds, as aforesaid, to that storage location in which that said discrete information representation in that sequence preceding is stored to which that one being stored corresponds.

71. The method of claim 70 wherein said storage means is capable of retrieving at least portions of selected ones of said plurality of sequences of said discrete information representations and, upon completing that retrieval, being capable of retrieving at least portions of a correspondence sequence of said corresponding discrete information representations with there being one from each of selected ones of said plurality of sequences of said discrete information representations in said sequence orders said retrieved of said correspondence sequence occurring by said storage means retrieving by direct access to those corresponding said storage sites in which said correspondence sequence discrete information items are located.

72. The method of claim 70 wherein said storage means is capable of retrieving at leas portions of a correspondence sequence of said corresponding discrete information representations with there being one from each of selected ones of said plurality of sequences of said discrete information representations in said sequence order, said retrieval of said correspondence sequence occurring by said storage means retrieving by direct access to those corresponding said storage sites in which said correspondence sequence discrete information items are located, and, upon completing that retrieval, being capable of retrieving at least portions of selected ones of said plurality of sequences of said discrete information representations.

73. The method of claim 70 wherein said discrete information representations are arrangeable as cells in a first rectangular array in rows and columns with said first and second sequences of discrete information representations each being at least a portion of a row in said first rectangular array such that a said discrete information representation in said first sequence thereof corresponds, as aforesaid, to a said discrete information representation in said second sequence thereof through sharing a common said column therewith in said first rectangular array.

74. A method for retrieving discrete information representations from any of a plurality of storage locations in an alterable state material provided in a storage means with said plurality of storage locations including first and second sequential pluralities thereof each of which has its said storage locations arranged in a sequential order, said storage means being capable of permitting access successively to said storage locations in each of said first and second sequential pluralities thereof only in its said sequential order for purposes of such retrieving and, after permitting access to a selected said storage location in one of said first and second sequential pluralities thereof for such a purpose, being capable of permitting that access next following for such a purpose to be to a corresponding said storage location in that other said sequential plurality remaining that is that one first available for such a following access, said first sequential plurality of storage locations in said alterable state material having a first sequence of discrete information representations stored sequentially therein beginning at a selected storage location, said second sequential plurality of storage locations having a second sequence of discrete information representations stored therein where each said discrete information representation in said first sequence thereof has a corresponding discrete information representation in said second sequence thereof, and with each of said discrete information representations in said second sequence thereof being stored in said second sequential plurality of said storage locations beginning with that one first available from said selected location in said first sequential plurality of storage locations, as aforesaid, and onward therefrom, said method comprising:

retrieving a first discrete information representation from said first sequence thereof;

retrieving directly a second discrete information representation in said second sequence thereof corresponding to said first discrete information representation retrieved, as aforesaid; and providing said first and second discrete information representations at least at one output of said storage means.

75. The method of claim 74 wherein said discrete information representations are arrangeable as cells in a first rectangular array in rows and columns with said first and second sequences if discrete information representations each being at least portions of rows in said first rectangular array such that a said discrete information representation in said first sequence thereof corresponds, as aforesaid, to a said discrete information representation in said second sequence thereof through sharing a common said column therewith in said first rectangular array.

76. The method of claim 74 wherein there is a third sequential plurality of said storage locations which has its storage locations arranged in a sequential order and said storage means is capable of permitting access successively to said storage locations in said third sequential plurality thereof only in its said sequential order for purposes of such retrieving and, after permitting access to a selected said storage location in said second sequential plurality thereof for such a purpose, being capable of permitting that access next following for such a purpose to be to a corresponding said storage location in said third sequential plurality thereof that is that one first available for such a following access, said third sequential plurality of storage locations having a third sequence of said discrete information representations stored therein where each said discrete information representation sequentially in said second sequence thereof has a corresponding discrete information representation in said third sequence thereof, and with each of said discrete information representations in said third sequence thereof being stored in said storage locations in said third sequential plurality thereof beginning with that one first available from said storage location in said second sequential plurality thereof in which said second sequence discrete information representations were begun being stored, as aforesaid, and onward therefrom, and said method further comprises:

retrieving directly a third discrete information representation in said third sequence thereof corresponding to said second discrete information representation retrieved, as aforesaid; and providing said first, second and third discrete information representations at least on one output of said storage means.

77. A storage means for storing discrete information representations at, and retrieving such discrete information representations from, any of a plurality of storage locations in an alterable state material provided in said storage means, said storage means comprising:

an alterable state material provided on a substrate having an ordered multiplicity of sequential pluralities of said storage locations in a plurality order each of which said sequential pluralities has its said storage locations arranged in a storage location sequential order;

an access means capable of access successively to said storage locations of each of said sequential pluralities thereof in said multiplicity of sequential pluralities but only in said storage location sequential order for purposes of said storing and retrieving and, after having access to a selected said storage location in one of said sequential pluralities from said multiplicity thereof for such a purpose, being capable of permitting that access next following for such a purpose to be a corresponding said storage location in that said sequential plurality next in order in said plurality order which is first available for such a following access;

receiving means for receiving a plurality of corresponding sequences of said discrete information representations and maintaining them in a sequence order such that each said discrete information representation in a sequence thereof has maintained its correspondence with that corresponding said discrete information representation in that sequence next in said sequence order; and a control means capable of directing said access means to store said plurality of sequences of said discrete information representations in said multiplicity of sequential pluralities of said storage locations with said sequence order corresponding to said plurality order such that a discrete information representation in a sequence from said plurality thereof is stored at a selected said storage location in a sequential plurality thereof and its corresponding said discrete information representation in that sequence next in order in said sequence order is s stored in that storage location in that sequential plurality thereof next in order in aid plurality order which is first available from said selected storage location.

78. A storage means for retrieving discrete information representations from any of a plurality of storage locations in an alterable state material provided in said storage means, said storage means comprising:

an alterable state material provided on a substrate having an ordered multiplicity of sequential pluralities of said storage locations in a plurality order each of which said sequential pluralities has its said storage locations arranged in a storage location sequential order, there being a plurality of corresponding sequences of said discrete information representations in a sequence order stored sequentially in said multiplicity of sequential pluralities of storage locations with said sequence order corresponding to said plurality order, each said discrete information representation in a sequence thereof having a corresponding said discrete information representation in that sequence next in said sequence order;

an access means capable of access successively to said storage locations of each of said sequential pluralities thereof in said multiplicity of sequential pluralities but only in said storage location sequential order for purposes of said retrieving and, after having access to a selected said storage location in one of said sequential pluralities from said multiplicity thereof for such a purpose, being capable of permitting that access next following for such a purpose to be to a corresponding said storage location in that said sequential plurality next in order in said plurality order which is first available for such a following access; and a control means capable of directing said access means to retrieve said plurality of sequences of said discrete information representations such that a discrete information representation in a sequence from said plurality thereof is retrieved from a selected said storage location in a sequential plurality from said multiplicity thereof and its corresponding said discrete information representation in that sequence next in order in said sequence order is retrieved from that storage location in that sequential plurality thereof next in order in said plurality order which is first available from said selected storage location.

* * * * *

UNITED STATES PATENT AND TRADEMARK OFFICE
CERTIFICATE OF CORRECTION

PATENT NO. : 5,008,819

DATED : April 16, 1991

INVENTOR(S) : George G. Gorbatenko

It is certified that error appears in the above-identified patent and that said Letters Patent is hereby corrected as shown below:

Col. 37, line 58, after "such", insert --a--.

Col. 40, lines 13-14, after "information", insert --representations, and storing each of them in one of said sequential pluralities of storage locations with said sequence order corresponding to said plurality order and with each discrete information--.

Col. 40, line 33, delete "orders said retrieved", insert --order, said retrieval--.

Col. 40, line 39, delete "leas", insert --least--.

Col. 41, line 40, delete --if--, insert --of--.

Col. 42, line 58, delete "aid", insert --said--

Signed and Sealed this

First Day of September, 1992

*Attest:*

DOUGLAS B. COMER

*Attesting Officer*      *Acting Commissioner of Patents and Trademarks*